(12) United States Patent
Yu et al.

(10) Patent No.: US 8,412,273 B2
(45) Date of Patent: Apr. 2, 2013

(54) MULTI-MODE BASE STATION AND METHOD FOR DATA TRANSMISSION

(75) Inventors: Weidong Yu, Shenzhen (CN); Jun Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/237,421

(22) Filed: Sep. 20, 2011

(65) Prior Publication Data

US 2012/0009977 A1    Jan. 12, 2012

Related U.S. Application Data

(63) Continuation of application No. PCT/CN2010/071122, filed on Mar. 18, 2010.

(30) Foreign Application Priority Data

Mar. 20, 2009   (CN) .......................... 2009 1 0129507

(51) Int. Cl.
*H04M 1/00*   (2006.01)
(52) U.S. Cl. ..................................... 455/561; 455/552.1
(58) Field of Classification Search .................. None
See application file for complete search history.

(56) References Cited

U.S. PATENT DOCUMENTS

| | | |
|---|---|---|
| 2007/0091896 A1 | 4/2007 | Liu et al. |
| 2007/0116046 A1 | 5/2007 | Liu et al. |
| 2008/0320156 A1 | 12/2008 | Chen et al. |
| 2009/0245228 A1 | 10/2009 | Osterling |

FOREIGN PATENT DOCUMENTS

| | | |
|---|---|---|
| CN | 1956564 A | 5/2007 |
| CN | 1960231 A | 5/2007 |
| CN | 1174981 A | 5/2008 |
| CN | 101198150 A | 6/2008 |
| CN | 101242593 A | 8/2008 |
| CN | 101252757 A | 8/2008 |
| CN | 101309442 A | 11/2008 |
| EP | 2273847 A1 | 1/2011 |
| WO | WO 2007/134483 A1 | 11/2007 |
| WO | WO 2008067720 A1 | 6/2008 |
| WO | WO 2008113580 A2 | 9/2008 |
| WO | WO 2008/120297 A1 | 10/2008 |
| WO | WO 2008/146330 A1 | 12/2008 |

OTHER PUBLICATIONS

International Search Report and Written Opinion of the International Searching Authority issued in corresponding PCT Patent Application No. PCT/CN2010/071122, mailed Jul. 8, 2010.
Office Action issued in commonly owned U.S. Appl. No. 13/428,685, mailed May 9, 2012.
Office Action issued in corresponding Chinese Patent Application No. 200910129507.6, mailed Jul. 5, 2012.
Extended European Search Report issued in corresponding European Patent Application No. 10753139.4, mailed Sep. 4, 2012.

*Primary Examiner* — Rafael Pérez-Gutiérrez
*Assistant Examiner* — German Viana Di Prisco
(74) *Attorney, Agent, or Firm* — Brinks Hofer Gilson & Lione

(57) ABSTRACT

The present invention provides a method and device for data transmission. The method for data transmission includes: when a base station supports multiple radio access technologies, determines radio access technologies respectively supported by RE's two ports, and transmits data corresponding to the radio access technologies respectively through the two ports. With the technical solutions provided in embodiments of the present invention, the base station can support multiple radio access technologies and transmit service data and control data corresponding to multiple radio access technologies.

32 Claims, 18 Drawing Sheets

MULTI-MODE BASE STATION AND METHOD FOR DATA TRANSMISSION

CROSS-REFERENCE TO RELATED APPLICATIONS

This application is a continuation of International Application No. PCT/CN2010/071122, filed on Mar. 18, 2010, which claims priority to Chinese patent application No. 200910129507.6, filed on Mar. 20, 2009, both of which are incorporated herein by reference in their entireties.

FIELD OF THE INVENTION

The present invention relates to communications technologies, and in particular, to a method and device for data transmission.

BACKGROUND OF THE INVENTION

CPRI (Common Public Radio Interface) specifications are specifications for an interface between a REC (Radio Equipment Controller) and a RE (Radio Equipment) inside a radio base station. A CPRI includes three planes: a user data plane, a management and control plane, and a synchronization control plane. According to related protocols, the CPRI is divided into three layers: a physical layer (Layer 1, L1), a link layer (Layer 2, L2), and an application layer (Layer 3, L3). To know about topology information about a CPRI link (including header and tailor information, and RE position information about the CPRI link), the REC transmits service data (for example, IQ data) and control data (for example, HDLC (High-level Data Link Control) data) over the CPRI link, and performs TOP scan (Topology Scan).

A base station that can simultaneously support multiple radio access technologies is available in the prior art, which is called a multi-mode base station. However, the CPRI link between the REC and RE in a conventional multi-mode base station only supports a unitary radio access technology.

SUMMARY OF THE INVENTION

In one aspect, an embodiment of the present invention provides a method for data transmission. The method includes:
when base station supports multiple radio access technologies,
determining, by a radio equipment (RE) in a base station, the radio access technologies supported respectively by the RE's two ports; and
transmitting data corresponding to the radio access technologies respectively by using the two ports.

In another aspect, an embodiment of the present invention provides another method for data transmission. The method includes:
when a base station supports multiple radio access technologies, receiving, by a radio equipment (RE) in the base station, through a first port, downlink data that is corresponding to a first group of radio access technology and is sent by a REC, and obtaining, by the RE, downlink data of the RE from the downlink data corresponding to the first group of radio access technology; and
by the RE, combining uplink data corresponding to a second group of radio access technology supported by a second REC with the downlink data corresponding to the first group of radio access technology, and then sending, through a second port, the combined data to the second REC.

In another aspect, an embodiment of the present invention provides another method for data transmission. The method includes:
when a base station supports multiple radio access technologies,
by a radio equipment (RE) in the base station, receiving, through a first port, downlink data that is corresponding to a first group of radio access technology and is sent by a first REC, and sending, through the first port, uplink data corresponding to the first group of radio access technology to the first REC; and
receiving, by the RE, through a second port, downlink data that is corresponding to a second group of radio access technology and is sent by a second REC, and sending, by the RE, through the second port, uplink data corresponding to the second group of radio access technology to the second REC.

In another aspect, an embodiment of the present invention provides another method for data transmission. The method includes:
when a base station supports multiple radio access technologies,
receiving, by a second REC in the base station, data sent from a first REC, wherein when passing through a RE, the data sent by the first REC is added with the data sent by the RE to the second REC; and
obtaining, by the second REC, from the received data, the data corresponding to the radio access technology supported by the second REC.

In another aspect, an embodiment of the present invention provides another method for data transmission. The method includes:
when a base station supports multiple radio access technologies,
by a first radio equipment controller (REC) in the base station, receiving uplink data that is corresponding to a first group of radio access technology and is sent by a radio equipment (RE) through a first port, and sending downlink data corresponding to the first group of radio access technology; and
by a second REC in the base station, receiving uplink data that is corresponding to a second group of radio access technology and is sent by the RE through a second port, and sending downlink data corresponding to the second group of radio access technology to the RE.

In another aspect, an embodiment of the present invention provides a base station device supporting multiple radio access technologies. The base station device includes: an RE, a first REC supporting a first group of radio access technology, and a second REC supporting a second group of radio access technology.

The first REC is configured to send downlink data corresponding to the first group of radio access technology to the RE.

The RE is configured to receive, through a first port, from the second REC, the downlink data corresponding to the first group of radio access technology, obtain data of the RE from the received downlink data corresponding to the first group of radio access technology, and combine uplink data corresponding to a second group of radio access technology with the downlink data corresponding to the first group of radio access technology and send the combined data through a second port.

The second REC is configured to receive the data which is sent by the RE through the second port, and obtain, from the received data, the uplink data corresponding to the second group of radio access technology.

In another aspect, an embodiment of the present invention provides a base station device supporting multiple radio access technologies. The base station device includes: an RE, a first REC supporting a first group of radio access technology, and a second REC supporting a second group of radio access technology.

The first REC is configured to send downlink data corresponding to a first group of radio access technology to the RE and receive uplink data that is corresponding to the first group of radio access technology and is sent by the RE.

The second REC is configured to send downlink data corresponding to a second group of radio access technology to the RE and receive uplink data that is corresponding to the second group of radio access technology and is sent by the RE.

In another aspect, an embodiment of the present invention provides an RE, including an interface module and a signal processing module.

The interface module is configured to obtain service data of the RE from downlink service data corresponding to a first group of radio access technology, wherein the downlink service data is sent by a first REC and is received by the RE through a first.

The signal processing module is configured to receive from the interface module the downlink service data corresponding to the first group of radio access technology, and send uplink service data corresponding to a second group of radio access technology supported by a second REC to the interface module.

The interface module combines the uplink service data that is corresponded to the second group of radio access technology and is received from the signal processing module, with the downlink service data corresponding to the first group of radio access technology, and then sends, through a second port, the combined data to the second REC.

In another aspect, an embodiment of the present invention provides an RE, including an interface module and a signal processing module.

The interface module is configured to receive, through a first port, downlink service data received by the RE through a first port and sent by a first REC, wherein the downlink service data sent by the first REC is corresponds to a first group of radio access technology REC and send the received downlink service data to the signal processing module; and receive, through a second port, downlink service data that is corresponding to a second group of radio access technology and is sent by a second REC, and send the downlink service data to the signal processing module.

The signal processing module is configured to receive, from the interface module, the downlink service data corresponding to the first group of radio access technology and send uplink service data corresponding to the first group of radio access technology supported by the first REC to the interface module; and receive the downlink service data corresponding to the second group of radio access technology from the interface module and send uplink service data corresponding to the second group of radio access technology, which belongs to the second REC, to the interface module.

The interface module sends, through a first port, the uplink service data, that is of the first REC supporting the first group of radio access technology and is from the signal processing module, to the first REC, and sends, through a second port, the uplink service data that is of the second REC supporting the second group of radio access technology and is from the signal processing module, to the second REC.

In another aspect, an embodiment of the present invention provides an REC, including an interface module and a signal processing module.

The interface module is configured to receive service data that is sent by a peer REC and passes through a radio equipment (RE), and obtain, from the received service data, uplink service data corresponding to radio access technology) supported by the REC, wherein during transmission, the service data is added with the uplink service data that is corresponding to the radio access technology supported by the REC and is sent by the RE to the REC.

The signal processing module is configured to receive the uplink service data corresponding to the radio access technology supported by the REC.

According to embodiments of the present invention, when a base station supports multiple radio access technologies, an RE determines the radio access technologies supported by its two ports, and transmits data corresponding to the radio access technologies through the two ports. In this way, the RE can transmit service data normally when the base station supports multiple radio access technologies.

DETAILED DESCRIPTION OF THE EMBODIMENTS

Embodiments of the present invention may apply to a multi-mode base station supporting different radio access technologies, such as, the multi-mode base station that may support any combination of global system for mobile communications (GSM), universal mobile telecommunications system (UMTS), code division multiple access (CDMA), worldwide interoperability for microwave access (WIMAX), and long term evolution (LTE), for example, a multi-mode base station supporting the GSM and UMTS, a multi-mode base station supporting the UMTS and CDMA, or a multi-mode base station supporting the UMTS and LET. The embodiments of the present invention may apply to a base station supporting multiple (two or more) radio access technologies. Each REC in the base station may support a group of radio access technology, and each group of radio access technology may include one or more radio access technologies.

For a convenient expression, the following embodiments of the present invention use the multi-mode base station supporting two radio access technologies, namely, GSM and UMTS, and one group only includes one radio access technology (GSM or UMTS) as an example for illustration. However, it should be noted that the embodiments of the present invention are not limited to the scenario that a group of radio access technology only includes one radio access technology. The technical solutions provided in the embodiments of the present invention may apply to a CPRI link, or may apply to an open base station architecture initiative (OBSAI) link, or may meet Ir interface technical requirements of a distributed base station. The CPRI link is used as an example below to describe the technical solutions of the embodiments of the present invention.

Figure 1:
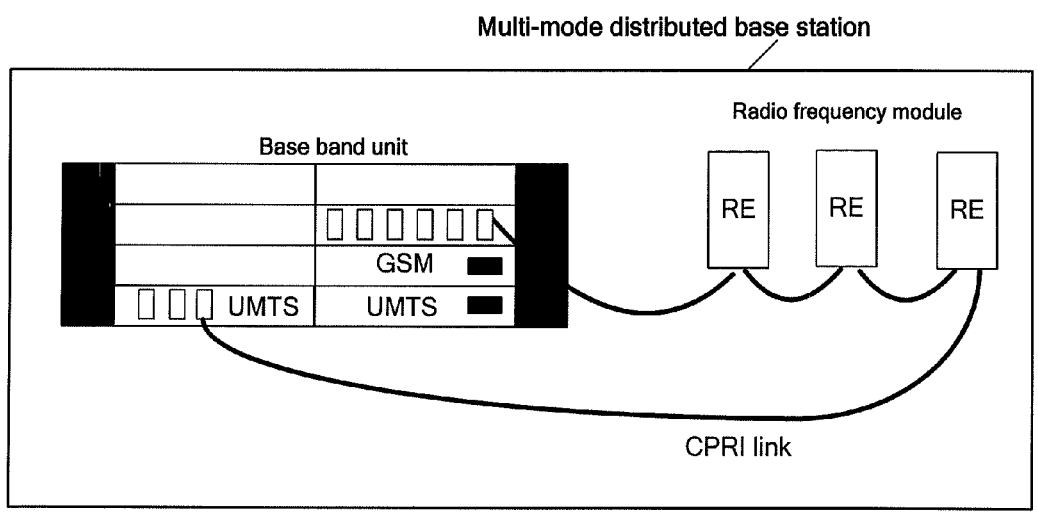
FIG. 1 is a connection schematic diagram of a CPRI link in a distributed base station according to an embodiment of the present invention.
Figure 2:
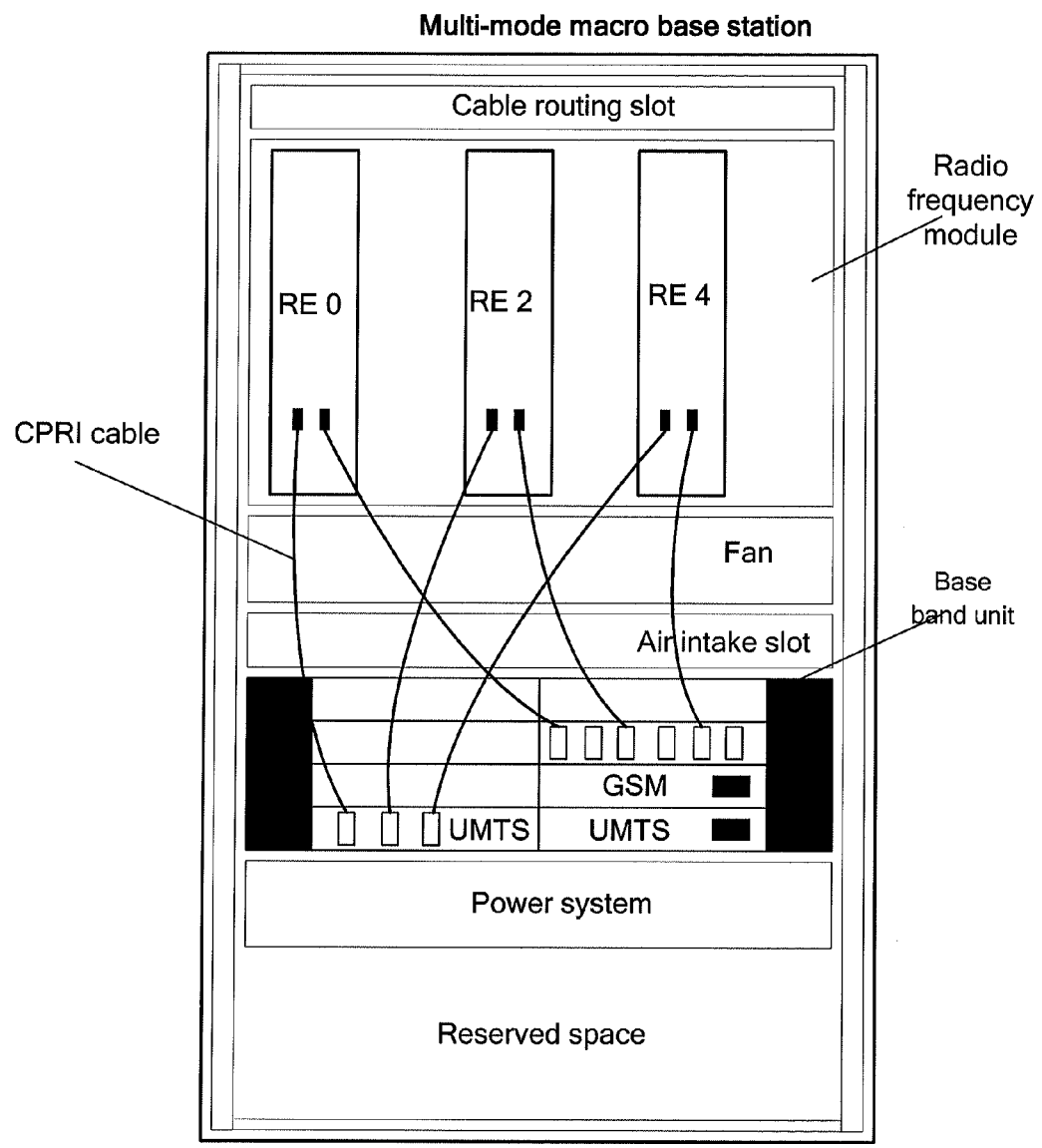
FIG. 2 is a connection schematic diagram of a CPRI link in a macro base station according to an embodiment of the present invention.

A base station may be divided into two parts: a base band unit (BBU) and a radio frequency (RF) module. The BBU includes an REC and the RF module includes an RE. It should be noted that the technical solutions provided in embodiments of the present invention not only apply to a distributed base station (as shown in FIG. 1) but also apply to a macro base station, whose structure may be shown in FIG. 2. But the macro base station is not limited to the structure shown in FIG. 2, the forms of structures may be also used, which do not affect the implementation of the present invention. The technical solutions provided in embodiments of the present invention can be referred to, as long as in a base station the BBU and RF module are connected through the CPRI link. In addition, the BBU in embodiments of the present invention may have many hardware structures, and not limited to the structure of being formed with multiple slot boards. Other structure may also be used, for example, one board in the BBU. In this case, the multi-mode base station is implemented through multiple BBUs in a module stacking manner.

Figure 3:
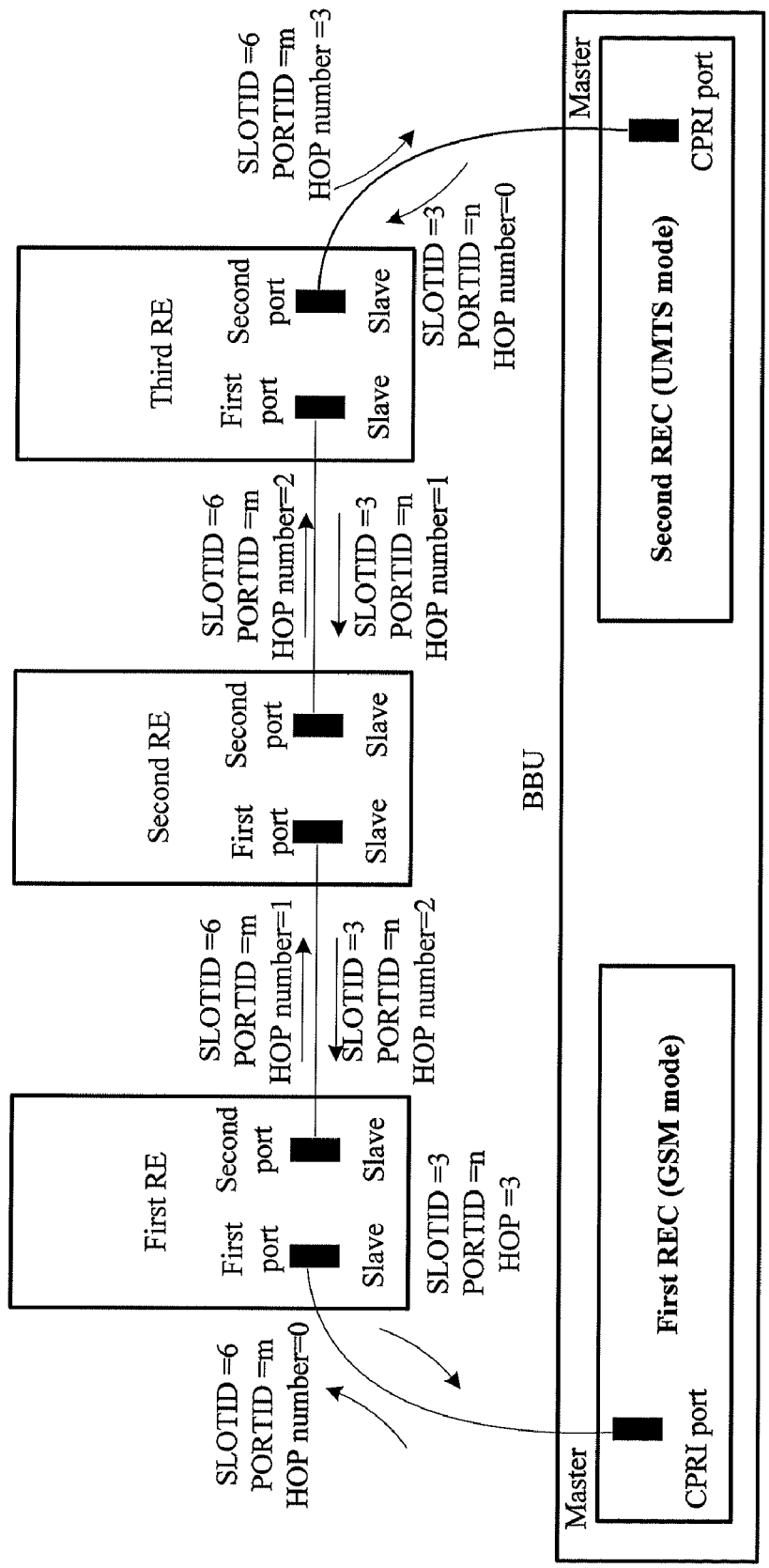
FIG. 3 is a connection schematic diagram of a base station in a bidirectional link mode according to an embodiment of the present invention.
Figure 4:
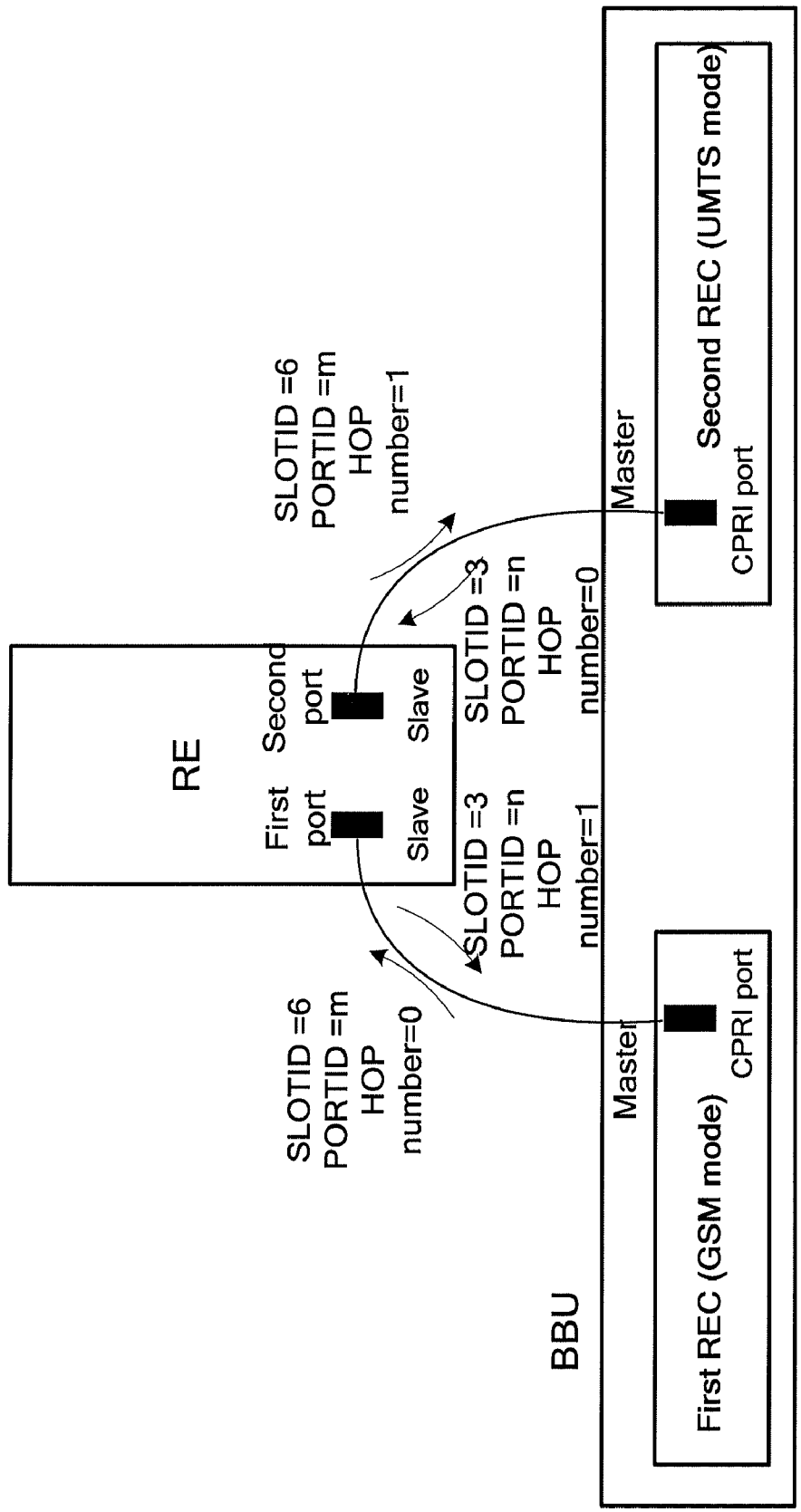
FIG. 4 is a connection schematic diagram of a base station in a dual-star link mode according to an embodiment of the present invention.

To enable the RE to connect to two RECs supporting different radio access technologies, embodiments of the present invention provide two link modes: a bidirectional link mode and a dual-star link mode. The bidirectional link mode supports a serial connection of the RE. One CPRI link has one or more REs, and the connection mode is shown in FIG. 3. In a dual-star link mode, one CPRI link has only one RE. The RE directly connects to two RECs supporting different radio access technologies, and the connection is shown in FIG. 4.

Figure 5:
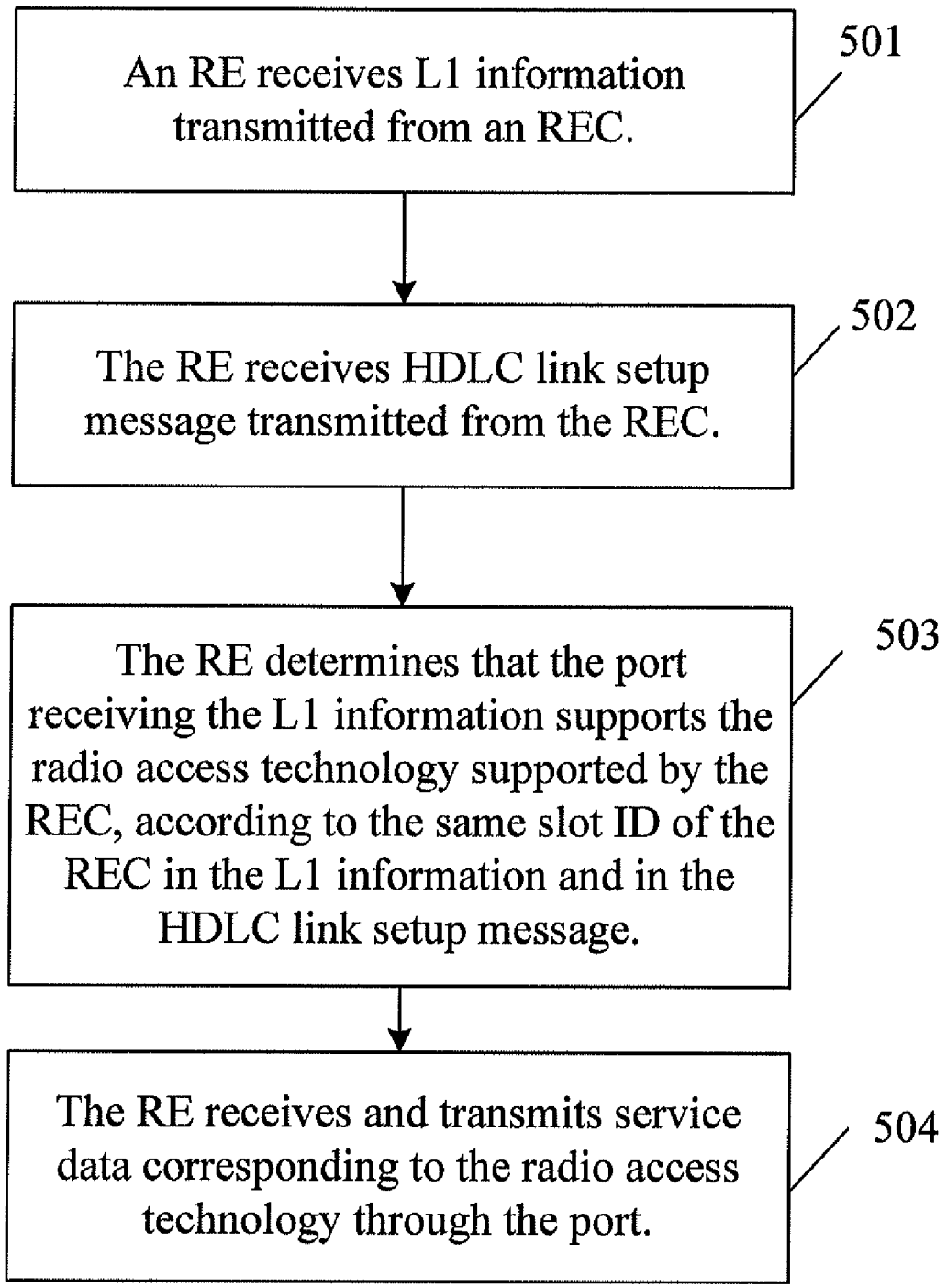
FIG. 5 is a flow chart of a method for an RE to determine the radio access technologies supported by its ports according to an embodiment of the present invention.

Because the RE has two ports, in this embodiment, the RE needs to determine the radio access technologies supported respectively by the two ports. FIG. 5 shows a method for the RE to determine the radio access technologies respectively supported by the two ports, by using the CPRI link as an example. The method includes:

Step 501: An RE receives Layer 1 information sent from an REC, where the L1 information includes a slot ID of the REC.

Step 502: The RE receives an HDLC link setup message sent from the REC, where the HDLC link setup message carries a slot ID of the REC and indication information about the radio access technology supported by the REC.

Step 503: The RE determines that a port receiving the L1 information supports the radio access technology supported by the REC, according to the slot IDs of the REC in the L1 information and in the HDLC link setup message being the same.

Step 504: The RE receives and sends, through the port, service data corresponding to the radio access technology.

Figure 6:
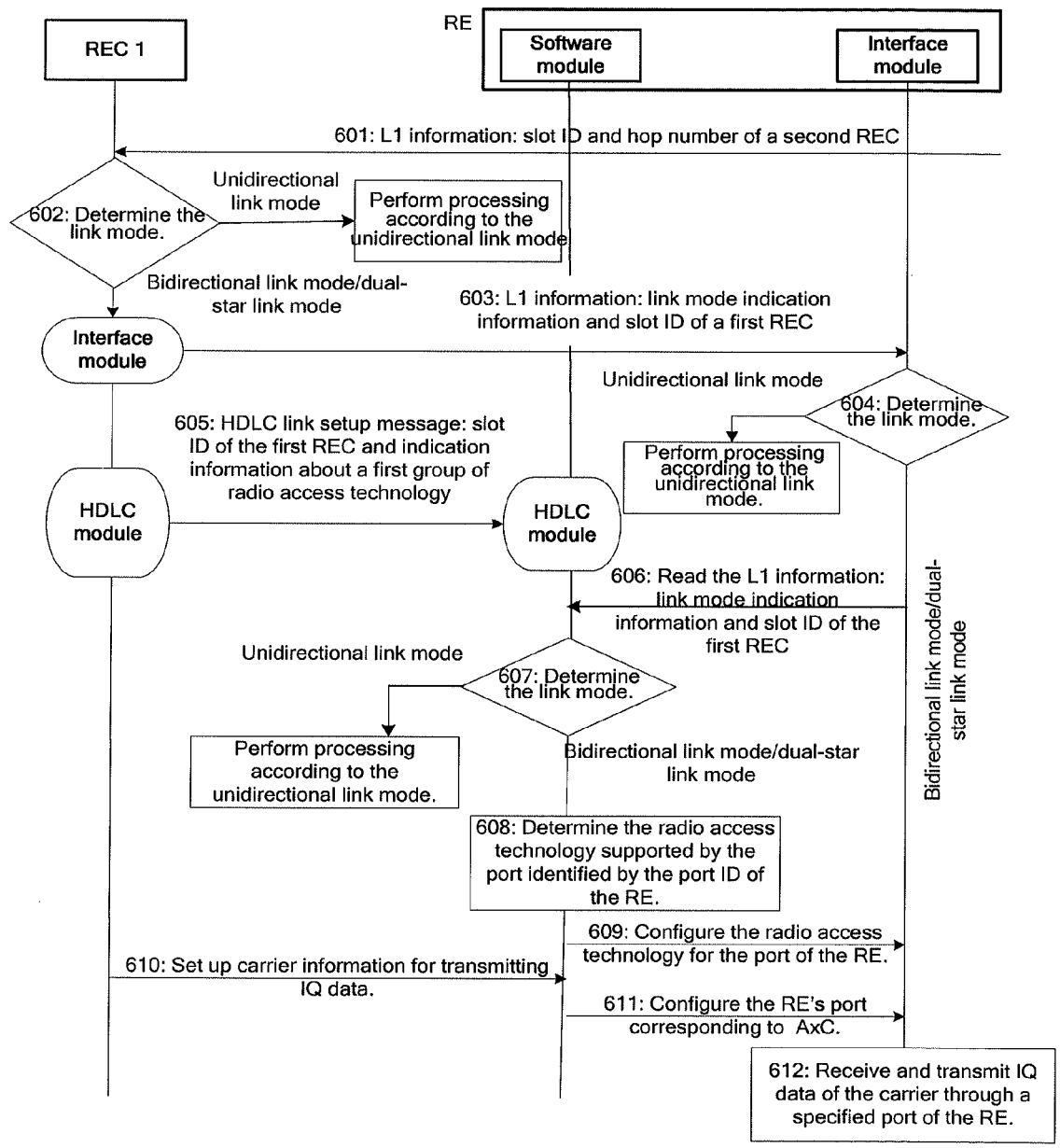
FIG. 6 is a flow chart of another method for an RE to determine the radio access technologies supported by its ports according to an embodiment of the present invention.
Figure 7:
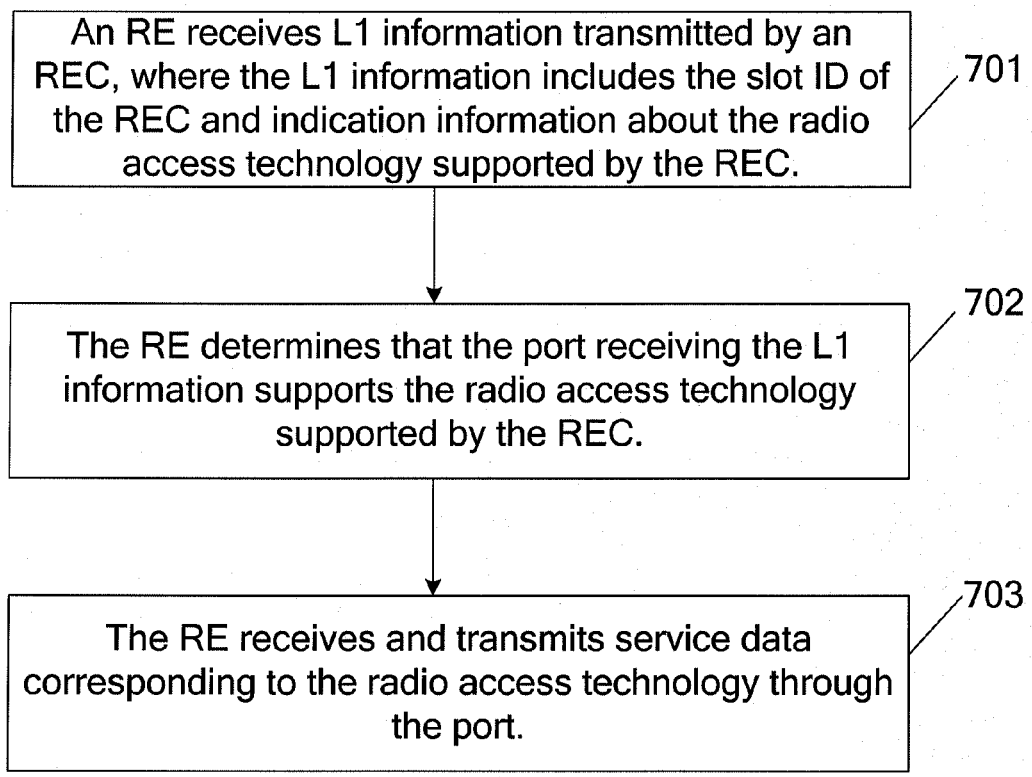
FIG. 7 is a flow chart of another method for an RE to determine the radio access technologies supported by its ports according to an embodiment of the present invention.

Referring to FIG. 6, a method for a RE to determine radio access technologies supported by the RE's two ports is described as follows. The method includes:

Step 601: A second REC sends Layer 1 information, i.e., L1 information, over a CPRI link to a first REC (REC 1). The first REC receives the L1 information. The L1 information includes a slot ID of a second REC and a topology scan number (hop number). The L1 information may also include a port ID.

Specifically, the first REC and the second REC may periodically transmit the L1 information over the CPRI link. It is assumed that the first REC supports GMS and the second REC supports UMTS. The L1 information in this embodiment includes: slot ID, hop number, and port ID. In a bidirectional link mode, as shown in FIG. 3, the first REC sends its slot ID=6, port ID=m, and hop number=0 over the CPRI link, and each RE on the CPRI link sends the hop number after adding 1 to the hop number. It is assumed that there are three REs on the CPRI link, the second REC receives hop number=3. In this manner, it can be learned that there are three REs on the CPRI link. Similarly, the second REC sends its slot ID=3, port ID=n, and hop number=0 over the CPRI link, each RE on the CPRI link sends the hop number after adding 1 to the hop number, and the first REC receives hop number=3. In this manner, it can be learned that there are three REs on the CPRI link. The RE may record the hop number for GSM and UMTS. For example, the first RE records hop number=0 for GSM and hop number=2 for UMTS.

In the dual-star link mode, as shown in FIG. 4, the first REC sends its slot ID=6, ports ID=m, and hop number=0 over the CPRI link. Only one RE is on the CPRI link. The RE sends the hop number after adding 1 to the hop number. In this manner, the second REC receives hop number=1. Similarly, the first REC receives the port ID, slot ID, and hop number of the second REC, where the hop number=1. The RE may record the hop number for GSM and may record the hop number for UMTS. For example, the first RE records hop number=0 for GSM mode and hop number=0 for UMTS.

Step 602: The first REC judges a link mode of the CPRI link by using, for example, a high-level software module. If the CPRI link is in a unidirectional link mode, related processing is performed for the unidirectional link mode according to the process in the current solution, which is not detailed description here; if the CPRI link is in a bidirectional link mode or dual-star link mode, step 603 is performed.

An REC includes a software module, where the software module further includes a low-level software module and a high-level software module.

Figure 9:
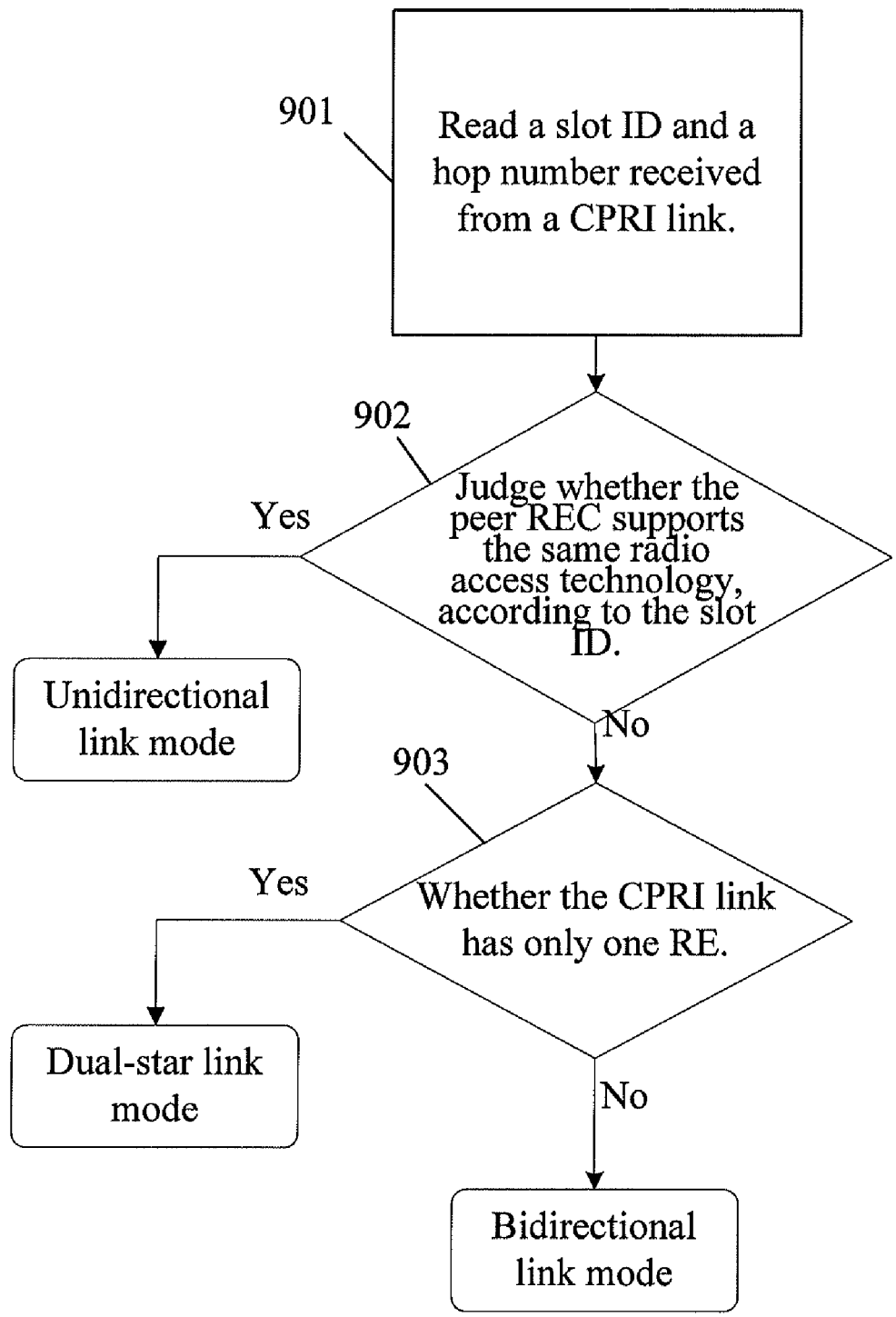
FIG. 9 is a flow chart of a method for an REC to judge a link mode of the CPRI according to an embodiment of the present invention.

In step 602, the method for the high-level software module of the first REC to judge the CPRI link mode can be referred to FIG. 9 and the corresponding embodiment.

Step 603: An interface module of the first REC sends L1 information to the RE. The L1 information includes link mode indication information, slot ID and Hop number of the first REC. Further, the L1 information may include a port ID of the first REC.

The interface module in this embodiment and the following embodiments may be field programmable gate array (FPGA), but is not limited to the FPGA. Other interface modules may be used, for example, application specific integrated circuit (ASIC).

The link mode indication information in the L1 information in this step is used to indicate that the link mode is a bidirectional link mode, a dual-star link mode, or a unidirectional link mode.

In this step, the L1 information may be shown in Table 1.

TABLE 1

| BYTE Index | Function | Content | Comment |
|---|---|---|---|
| Z.208.0 | M or S attribute | BIT3-BIT1: indicates the link mode. Bit0: indicates that the attribute of the port is master or slave. | BIT3-BIT1: indicates the link mode b'000: indicates the unidirectional link mode. b'001: indicates the bidirectional link mode. b'010: indicates the dual-star link mode. Bit0: 1 indicates that the attribute of the port is master. Bit0: 0 indicates that the attribute of the port is slave. |

If BIT3-BIT1=b'000, where b' indicates a binary bit, it indicates that a unidirectional link mode is used. In this link mode, the processing same as the prior art may be used, which is not repeatedly described here.

If BIT3-BIT1=b'001, it indicates that a bidirectional link mode is used. In this link mode, for any RE, configuration of attributes of two ports of the RE does not affect the receiving and sending data for the RE. The attributes of the two ports may be master or slave. A hop scan is implemented from two RECs on the bidirectional link to the peer RECs.

If BIT3-BIT1=b'010, it indicates that a dual-star link mode is used. In this link mode, configuration of attributes of two ports of the RE does not affect the receiving and sending data for the RE. The attributes of the two ports may be master or slave. A hop scan is implemented from two RECs on the dual-star link to peer RECs.

In this step, those skilled in the art should understand that the specific values of the preceding BIT3-BIT1 indicate that the corresponding link modes are used for illustration only. The present invention is not limited to the link modes indicated by the preceding values.

Step 604: The RE receives the L1 information through the first port, and determines the link mode according to the link mode indication information in the L1 information. For example, the interface module of the RE determines the link mode according to the link mode indication information.

An RE includes an interface module. After a port, for example, the first port, receives the L1 information, the interface module may determine the link mode according to the link mode indication information in the L1 information. In addition, the RE may further include a software module, where the software module further includes a low-level software module and a high-level software module.

In this step, the interface module determines the link mode so that, according to different link modes, different modes are used to send service data or control data after related configuration is completed. For example, in the bidirectional link mode or dual-star link mode, the mapping relationship between the RE's ports and carriers AxC and the service data needs to be configured, and then the service data is sent through the RE's ports. In the unidirectional link mode, related processing is performed for the unidirectional link mode according to the process in the current solution, which is not detailed here.

Step 605: The RE receives an HDLC link setup message sent by the first REC, for example, the HDLC module in the software module of the RE receives the HDLC link setup message sent by the first REC. The HDLC link setup message includes the slot ID of the first REC, indication information about a first group of radio access technology, hop number corresponding to the first group of radio access technology supported by the RE, and HDLC address allocated by the first REC to the RE. The HDLC module in the software module of the RE obtains, according to the received hop number corresponding to the first group of radio access technology, and saves the HDLC address allocated by the first REC to the RE.

The HDLC link setup message may further include the port ID of the first REC. The first group of radio access technology is radio access technology supported by the first REC.

The DHLC link setup message sent by the first REC may carry the hop number corresponding to the first group of radio access technology supported by each RE and the HDLC address corresponding to each RE on the link; or the first REC sends multiple DHLC link setup messages, where each message includes the slot ID of the first REC, indication information about the first group of radio access technology, hop number corresponding to the first group of radio access technology supported by the RE, and HDLC address of the RE.

Specifically, the HDLC link setup message is an HDLC frame whose contents are described in Table 2.

TABLE 2

| Field | content | Description |
|---|---|---|
| HDLC address | 0xFF | Address for receiving the HDLC frame, here it indicates broadcast address |
| Control type | XID | XID control frame type |
| Slot ID of REC | Integer type | Slot ID of REC |
| Port ID of REC | Integer type | CPRI Port ID of REC |
| RE hop number | Integer type | RE hop number |
| RE HLDC address | Integer type | HDLC address allocated by the REC to the RE |
| Radio access technology of REC | Bitmap type | Indication information about the radio access technologies supported by the RE. Bit with value 1 indicates that the corresponding radio access technology is supported, and bit with value 0 indicates that the corresponding radio access technology is not supported. B7: WCDMA B6: GSM B5: CDMA B4: WIMAX B3: LTE B2: UMB B1-B0: Reserved |

TABLE 2-continued

| Field | content | Description |
|---|---|---|
| | | If the REC supports multiple radio access technologies, the corresponding bits are all set to 1. |

Step 606: After the RE sets up an HDLC link, the high-level software module of the RE reads from the interface module the link mode indication information and slot ID of the first REC in the L1 information through the low-level software module, and receives indication information about the first port in the L1 information. In this embodiment and the following embodiments of the present invention, the indication information about the first port may be port ID of the first port, and is used for identifying the first port.

Step 607: The high-level software module of the RE judges the CPRI link mode according to the link mode indication information. If the CPRI link is in a unidirectional link mode, related processing is performed for the unidirectional link mode according to the current process; if the CPRI link is in a bidirectional link mode or dual-star link mode, step 608 is performed. In step 607, it is judged that the link mode is the bidirectional link mode or dual-star link mode.

Step 608: The high-level software of the RE reads, through the HDLC module, from the HDLC link setup message, the slot ID of the first REC and indication information about the first group of radio access technology and determines, according to the slot ID of the first REC, that the RE's port (the first port) receiving the L1 information supports the first group of radio access technology. Referring to Table 3, in this step, the method for determining that the RE's port (the first port) receiving the L1 information supports the first group of radio access technology is: if the REC's slot ID in the L1 information is the same as the REC's slot ID in L2 link setup message (referred to as HDLC link setup message here), it is determined that the RE's port (the first port) receiving the L1 information supports the first group of radio access technology in the HDLC link setup message.

TABLE 3

| L1 information | L2 link setup message | The corresponding relationship between the port IDs of the REs and the radio access technologies |
|---|---|---|
| Slot ID of the REC <—> the port ID of the RE | Slot ID of the REC <—> radio access technology information | Port ID of the REC <—> radio access technology information |

Step 609: The software module of the RE configures the radio access technology supported by the RE's first port for the interface module. For example, the interface module may be FPGA; in this case, the software module of the RE configures the radio access technology supported by the RE's first port for FPGA.

Step 610: The first REC sends, through a high-level message, to the RE, service area information occupied by the carriers of the group of radio access technology, or AxC (antenna-carrier) information about the carriers supporting the group of radio access technology.

The first REC may transmit data corresponding to the group of radio access technology by service area, or by using the AxC to carry the data corresponding to the group of radio access technology in the service area.

Step 611: The software module of the RE, for example, FPGA, configures, for the interface module, a mapping relationship between the service area information and a port ID of the first port of the RE, or the mapping relationship between the AxC information and the port ID of the first port of the RE. That is, the software module of the RE specifies that the RE receives and sends, through the first port, the service data corresponding to the radio access technologies supported by the first REC.

Step 612: The RE receives and sends, through the first port, the service data corresponding to the group of radio access technology supported by the first REC.

According to the method provided in the preceding embodiment, it may be further determined that the service data corresponding to the second group of radio access technology supported by the second REC is received and sent by the RE through the second port of the RE.

Optionally, an embodiment of the present invention provides another method for an RE to determine radio access technologies supported by its two ports. This method differs from the preceding one in that the RE can determine, according to L1 information, the radio access technologies supported by the ports. This method includes:

Step 701: An RE receives L1 information sent by an REC, where the L1 information includes a slot ID of the REC and indication information about radio access technology supported by the REC.

Step 702: It is determined that a port receiving the L1 information supports the radio access technology supported by the REC.

Step 703: The RE receives and sends, through the port, corresponding service data corresponding to the radio access technology.

Figure 8:
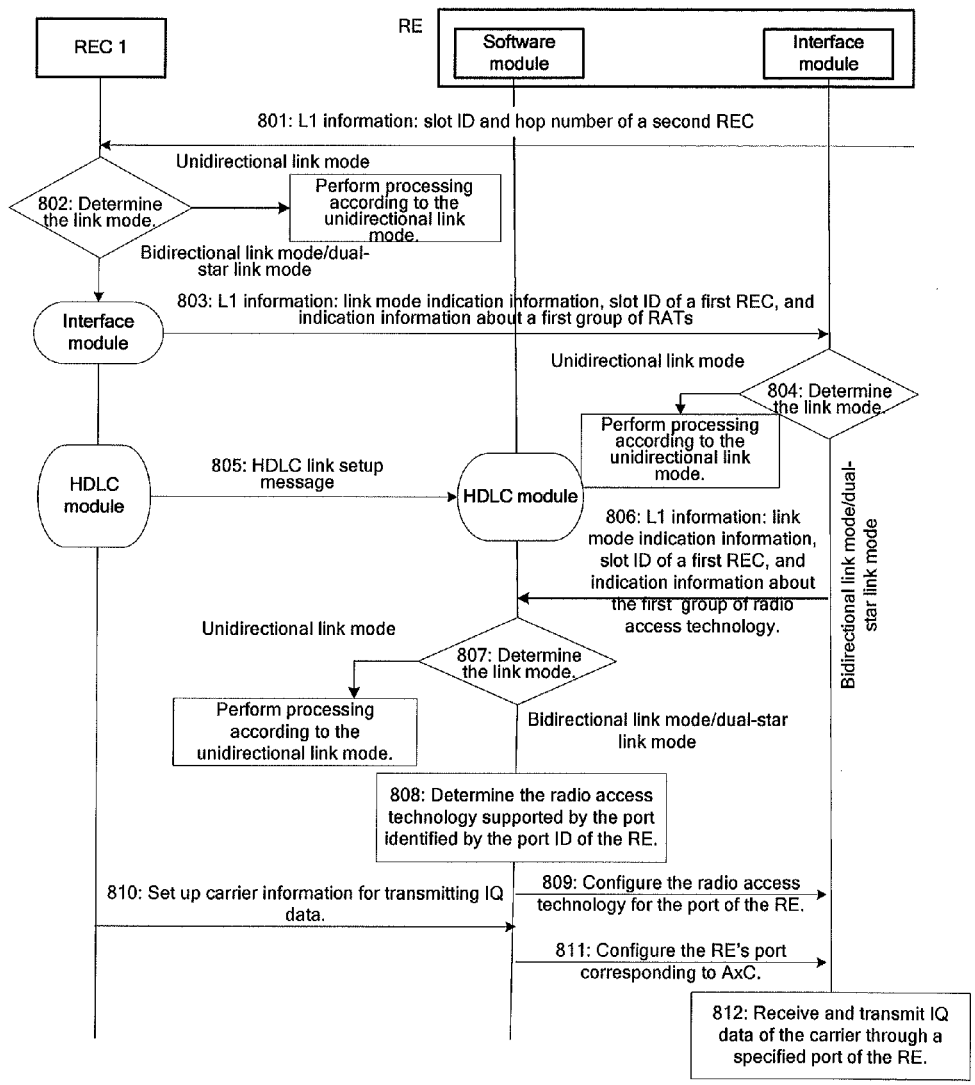
FIG. 8 is a flow chart of another method for an RE to determine the radio access technologies supported by its ports according to an embodiment of the present invention.

Referring to FIG. 8, another method for an RE to determine radio access technologies supported respectively by its two ports is described as follows. The method includes:

Step 801: A second REC sends Layer 1 information, i.e., L1 information, over a CPRI link to a first REC. The first REC receives the L1 information. The L1 information includes a slot ID and a hop number of the second REC. The L1 information may also include a port ID.

Step 802: A high-level software module of the first REC judges link mode of the CPRI link. If the CPRI link is in a unidirectional link mode, related processing is performed for the unidirectional link mode according to the current process; if the CPRI link is in a bidirectional link mode or dual-star link mode, step 803 is performed.

An REC includes a software module, where the software module further includes a low-level software module and a high-level software module.

Figure 10:
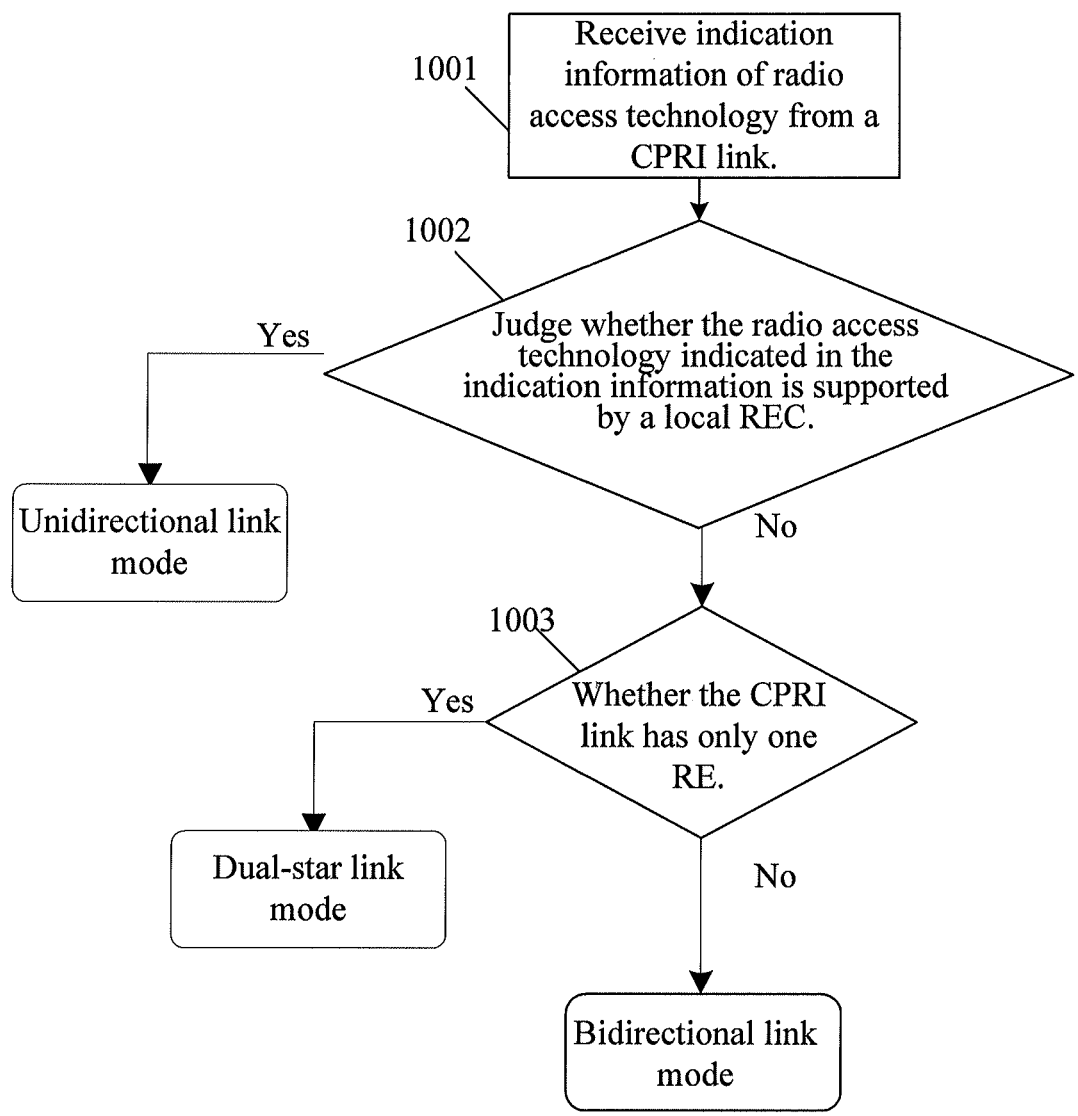
FIG. 10 is a flowchart of another method for an REC to judge a link mode of the CPRI according to an embodiment of the present invention.

In this step, the method for the high-level software module of the first REC determining the CPRI link mode can be referred to FIG. 9 and FIG. 10.

Step 803: An interface module of the first REC sends L1 information to the RE. The L1 information includes: link mode indication information, a slot ID of the first REC and a hop number of the first REC, and indication information about a first group of radio access technology. Further, the L1 information may include the port ID of the first REC. The contents of the L1 information are detailed in Table 4.

TABLE 4

| BYTE Index | Function | Content | Comment |
|---|---|---|---|
| Z.208.0 | M or S attribute | BIT3-BIT1: indicates the link mode. | BIT3-BIT1: indicates the link mode. b'000: indicates the |

TABLE 4-continued

| BYTE Index | Function | Content | Comment |
|---|---|---|---|
| | | Bit0: indicates that the attribute of the port is master or slave. | unidirectional link mode. b'001: indicates the bidirectional link mode. b'010: indicates the dual-star link mode. Bit0: 1 indicates that the attribute of the port is master. Bit0: 0 indicates that the attribute of the port is slave. |
| Z.208.1 | Standard | BIT7-BIT0: indicates the radio access technology information. | Indication information about the radio access technologies supported by the REC. Bit with value 1 indicates that the radio access technologies are supported, and bit with value 0 indicates that the radio access technologies are not supported. B7: WCDMA B6: GSM B5: CDMA B4: WIMAX B3: LTE B2: UMB B1-B0: Reserved If the REC supports multiple radio access technologies, the corresponding bits are all set to 1. |

Steps 804-805 are basically the same with steps 604-605.

Step 806: After the RE sets up an HDLC link, the high-level software module of the RE reads, through the low-level software module, from the interface module, the link mode indication information, slot ID of the first REC, indication information about the first group of radio access technology comprised in the L1 information, and a port number of the first port receiving the L1 information.

An RE includes an interface module and a software module, where the software module further includes a low-level software module and a high-level software module.

Step 807: The high-level software module of the RE judges the link mode of the CPRI link according to the link mode indication information. If the CPRI link is in a unidirectional link mode, related processing is performed for the unidirectional link mode according to the current process; if the CPRI link is in a bidirectional link mode or dual-star link mode, step 808 is performed. In step 807, it is judged that the link mode is the bidirectional link mode or dual-star link mode.

Step 808: The high-level software module of the RE determines that the first port receiving the L1 information supports the first group of radio access technology supported by the first REC.

Steps 809-812 are basically the same with steps 709-712.

It should be noted that the RE forwards the received slot ID (or, slot ID and port ID) of the REC between the two ports, that is, sends out, from the other port, the slot ID (or, the slot ID and port ID) of the REC after receiving the slot ID from one port. The processing is the same for each RE in the link. In the CPRI link, the slot ID (or, slot ID and port ID) of the REC at one end of the link is sent to the REC at the other end of the ring, and the REC at one end receives the slot ID (or, slot ID and port ID) of the REC at the other end. If the CPRI link is disconnected, the last RE on the link returns the received slot ID (or, slot ID and port ID). In this manner, the REC may receive the slot ID (or, slot ID and port ID) sent by the REC itself to learn that the link is disconnected.

According to the method provided in the preceding embodiment, it may be further determined that the service data corresponding to the second group of radio access technology supported by the second REC is received and sent through the second port of the RE.

Referring to FIG. 9, a method for a high-level software module of an REC to judge the CPRI link mode is described as follows:

Step 901: A high-level software module of an REC obtains a slot ID and hop number received from a CPRI link.

Step 902: The high-level software module judges, according to the received slot ID, whether the peer REC supports the same group of radio access technology. If the peer REC does not support the same group of radio access technology, it is regarded that the CPRI link is in a bidirectional link mode or dual-star link mode, and step 903 is performed; otherwise, the CPRI link is in a unidirectional link mode and the process ends.

Step 903: The high-level software module judges, according to the hop number, the number of REs on the CPRI link. If the CPRI link has only one RE, the CPRI link is in the dual-star link mode; if the CPRI link has multiple REs, the CPRI link is in the bidirectional link mode.

Referring to FIG. 10, another method for a high-level software module of an REC to judge the CPRI link mode is described as follows:

Step 1001: A high-level software module of an REC obtains radio access technology indication information and hop number that are received from a CPRI link.

In the CPRI link mode provided in this embodiment of the present invention, the REC receives the indication information about the radio access technologies supported by a peer REC.

Step 1002: The high-level software module judges whether the radio access technology indicated in the indication information received from the CPRI link is supported by the REC. If the radio access technology is not supported by the REC, the CPRI link is in a bidirectional link mode or dual-star link mode and step 1003 is performed; otherwise, the CPRI link is in a unidirectional mode and the process ends.

Step 1003: The high-level software module judges the number of REs on the CPRI link according to the hop number. If the CPRI link has only one RE, the CPRI link is in the dual-star link mode; if the CPRI link has multiple REs, the CPRI link is in the bidirectional link mode.

It should be noted that the bidirectional link mode shown in FIG. 9 and FIG. 10 is also applicable to the scenario where the CPRI link has only one RE. In this case, it is only required that two RECs preset whether the bidirectional link mode or dual-star link mode is to be used when there is only one RE on the CPRI link. The dual-star link mode is generally used, when there is only one RE on the CPRI link.

Considering frequent occurrence of transient disconnections on the CPRI link, a certain delay for the REC switching the mode of the link may be needed, and the delay can be preset to, for example, 3 minutes, that is, if it is detected that the CPRI link mode is changed from one mode to another mode and stays in this mode for 3 minutes, the CPRI link switches to still another mode.

Or, when a multi-mode base station is configured, the link mode (unidirectional link mode, bidirectional link mode, or dual-star link mode) is configured for the CPRI link. The high-level software module of the REC uses the methods described above to detect the actual CPRI link mode, and compares the detection result with the configured link mode.

If the detection result is inconsistent with the configured link mode, an alarm indicating that the link mode is abnormal is reported to notify the inconsistency.

Figure 11A:
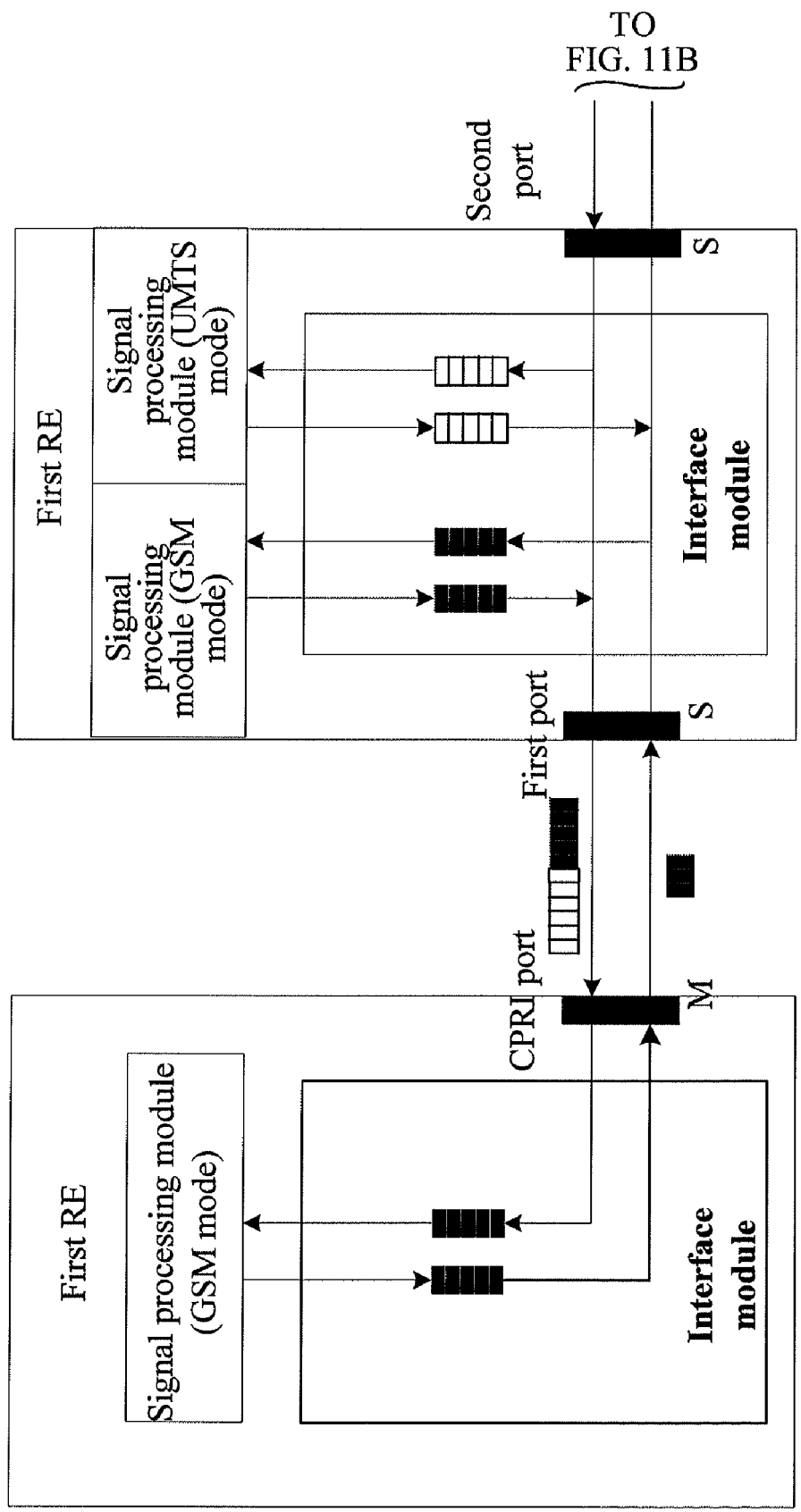
FIG. 11 is a schematic diagram of the service data transmission in a bidirectional link mode according to an embodiment of the present invention.
Figure 11B:
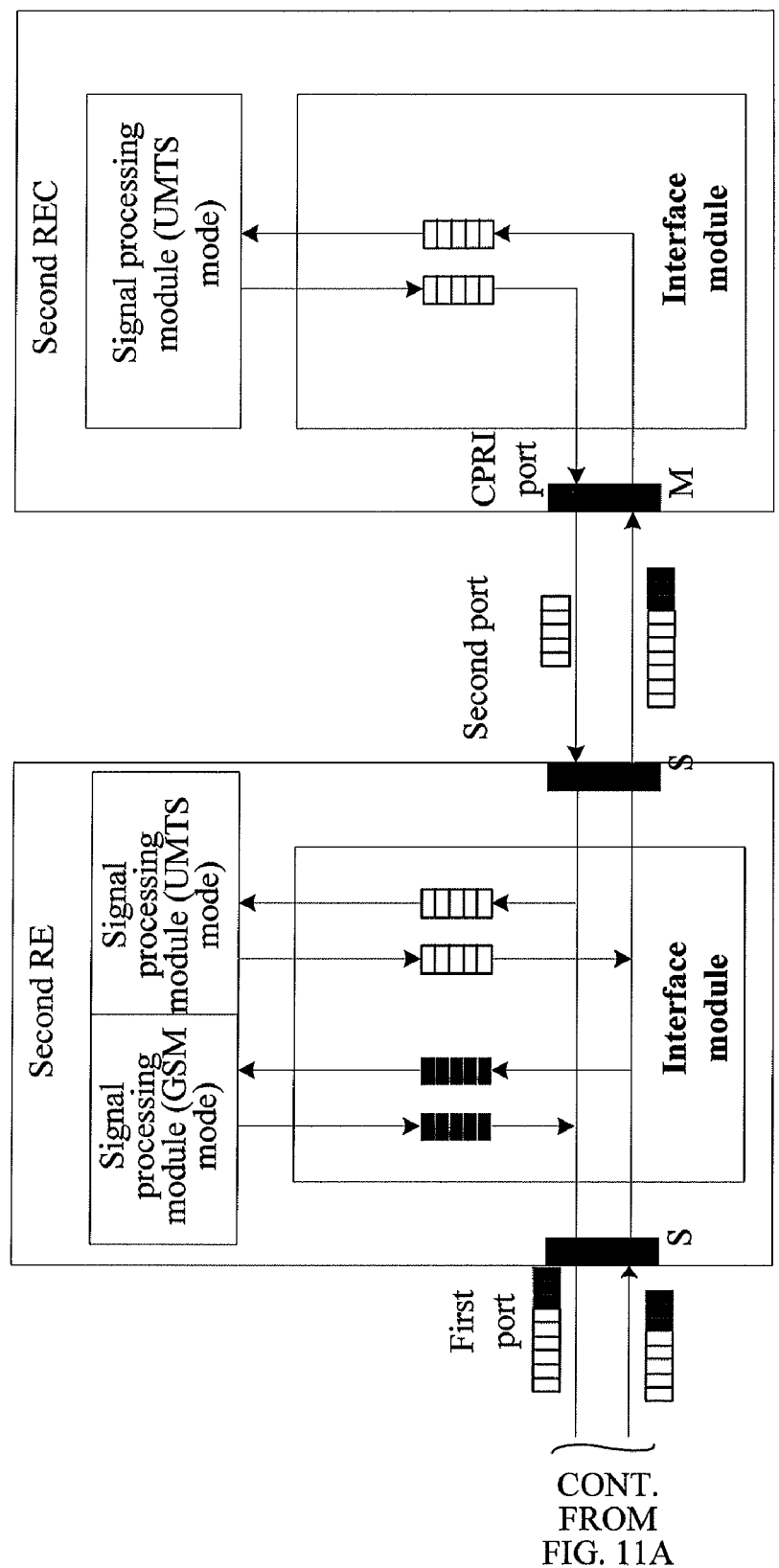

Referring to FIG. 11, the process of service data transmission in a bidirectional link mode is described as follows:

An RE receives service data corresponding to groups of radio access technologies from RE's two ports, and respectively sends the received data to a corresponding signal processing module. The signal processing module in this embodiment of the present invention may be a digital signal processor (DSP), an application specific integrated circuit (ASIC), or other types of signal processing devices, which do not affect the implementation of the present invention. The high-level software module configures, for an interface module, information about AxC or service area, where the AxC or service area is occupied by a carrier corresponding to each group of RATs supported by the RE. Therefore, the interface module may differentiate the service data corresponding to different groups of radio access technologies.

During service data transmission, the interface module sends the service data, which needs to be sent, to the RE's ports supporting the corresponding group of radio access technology, according to the group of radio access technology to which the service data that needs to be sent belongs.

In this embodiment, a first REC (assume that the first REC supports a first group of radio access technology, including GMS) sends downlink service data to the RE. The interface module of any RE on a CPRI link obtains, according to the AxC information or service area information, the service data of the RE from the first REC's downlink service data received by a port (a first port) supporting the first group of radio access technology, and sends the obtained service data to the RE's signal processing module corresponding to the first group of radio access technology. The interface module obtains uplink service data which needs to be sent to a second REC (assume that the second REC supports a second group of radio access technology, including UMTS mode) from RE's signal processing module corresponding to the second group of radio access technology, combines the obtained uplink service data with the downlink service data of the first REC, and transmits the combined service data to a next RE. If the node next to the RE is the second REC, the combined service data is directly transmitted to the second REC.

Specifically, on one direction of the CPRI link, a local REC (assume it is the first REC) first carries the downlink service data corresponding to a group of radio access technology, then each RE on the link obtains its downlink service data and adds the uplink service data corresponding to another group of radio access technology into the downlink service data corresponding to a group of radio access technology. Finally, the information that is carried on the CPRI link and sent to the REC at the other end of the link (the second REC) may include: the uplink service data corresponding to the radio access technologies supported by the second REC, and the downlink service data corresponding to the radio access technologies supported by the first REC. The second REC obtains the uplink service data corresponding to the radio access technology supported by the second REC, and discards the downlink service data that is corresponding to the radio access technologies supported by the peer REC.

The signal processing module corresponding to the first group of radio access technology and the signal processing module corresponding to the second group of radio access technology may be integrated into one signal processing module, which does not affect the implementation of the present invention.

The method that REC obtains uplink service data corresponding to the radio access technologies supported by the REC itself may be that: the interface module of the REC obtains its service data according to the preconfigured AxC or service area information.

An analysis on service bandwidth for transmitting service data in the bidirectional link mode according to this embodiment of the present invention is made, and it can be seen from the flowing equations that in the bidirectional link mode situation, in one direction, the downlink service data corresponding to one REC and the uplink service data corresponding to another REC share the service bandwidth on a CPRI link.

Assume that the first group of radio access technology supported by the first REC include only GSM mode, and the second group of radio access technology supported by the second REC include only UMTS mode:

Bandwidth occupied by services from GSM to UMTS=bandwidth occupied by GSM downlink service data+bandwidth occupied by UMTS uplink service data.

Bandwidth occupied by services from UMTS to GSM=bandwidth occupied by the UMTS downlink service data+bandwidth occupied by GSM uplink service data.

It can be seen that in the bidirectional link mode, the bandwidth consumed in two groups of radio access technologies supported respectively by two RECs does not increase, and the service data corresponding to the two groups of radio access technologies shares the service bandwidth on the CPRI link.

Figure 12:
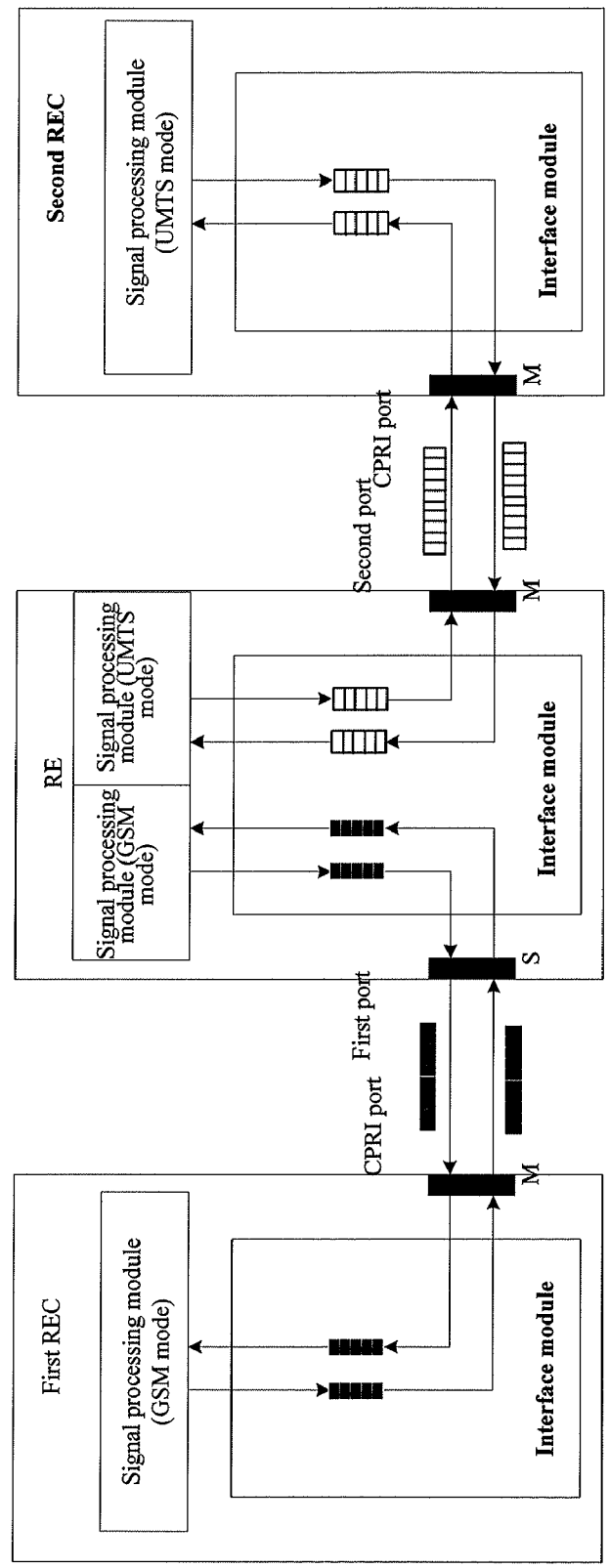
FIG. 12 is a schematic diagram of the service data transmission in a dual-star link mode according to an embodiment of the present invention.

Referring to FIG. 12, the transmission process of the service data in a dual-star link mode is described as follows:

A RE receives service data corresponding to a group of radio access technology from its one port and sends the received service data to a signal processing module corresponding to the group of radio access technology; and receives service data corresponding to another group of radio access technology from another port and sends the data to another signal processing module corresponding to the another group of radio access technology. A high-level software module configures AxC or service area information for an interface module, where the AxC or service area is occupied by a carrier corresponding to each group of radio access technology supported by the RE. Therefore, the interface module may differentiate the service data corresponding to different groups of radio access technologies.

During service data transmission, the interface module sends the service data, which needs to be sent, to the RE's ports supporting the corresponding group of radio access technology according to the group of radio access technology to which the service data that needs to be sent belongs to.

A first REC (assume that the first REC supports a first group of radio access technology, including the GMS mode) sends downlink service data to the RE. The interface module of the RE receives the downlink service data from a port (assuming a first port) supporting a first group of radio access technology and sends the received downlink service data to the signal processing module corresponding to the first group of radio access technology. The RE obtains uplink service data from the signal processing module corresponding to the first group of radio access technology and sends the obtained uplink service data through the first port to the first REC. Similarly, a second REC (assume that the second REC supports a second group of radio access technology, including the UMTS mode) sends downlink service data to the RE. The interface module of the RE receives the downlink service data from the port (the second port) supporting the second group of radio access technology and sends the received downlink service data to the signal processing module corresponding to the second group of radio access technology. The RE obtains uplink service data from the signal processing module and sends the obtained uplink service data through the second port to the second REC.

The signal processing module corresponding to the first group of radio access technology and the signal processing module corresponding to the second group of radio access technology may be integrated into one signal processing module, which does not affect the implementation of the present invention.

It can be seen from the preceding description that, as RE concatenation is not supported in the dual-star link mode, the sending of the service data from the REC to the RE ends at the RE and thus the data does not need to be forwarded by the RE from another port. The service data to be sent from the RE to the REC is needed to be differentiated and sent through the port supporting the corresponding group of radio access technology. The service data corresponding to a group of radio access technology may be sent only through the port supporting the group of radio access technology. It can be seen from FIG. 12 that, in this manner, the service data corresponding to a group of radio access technology may exclusively occupy the service bandwidth on one CPRI link.

Figure 13A:
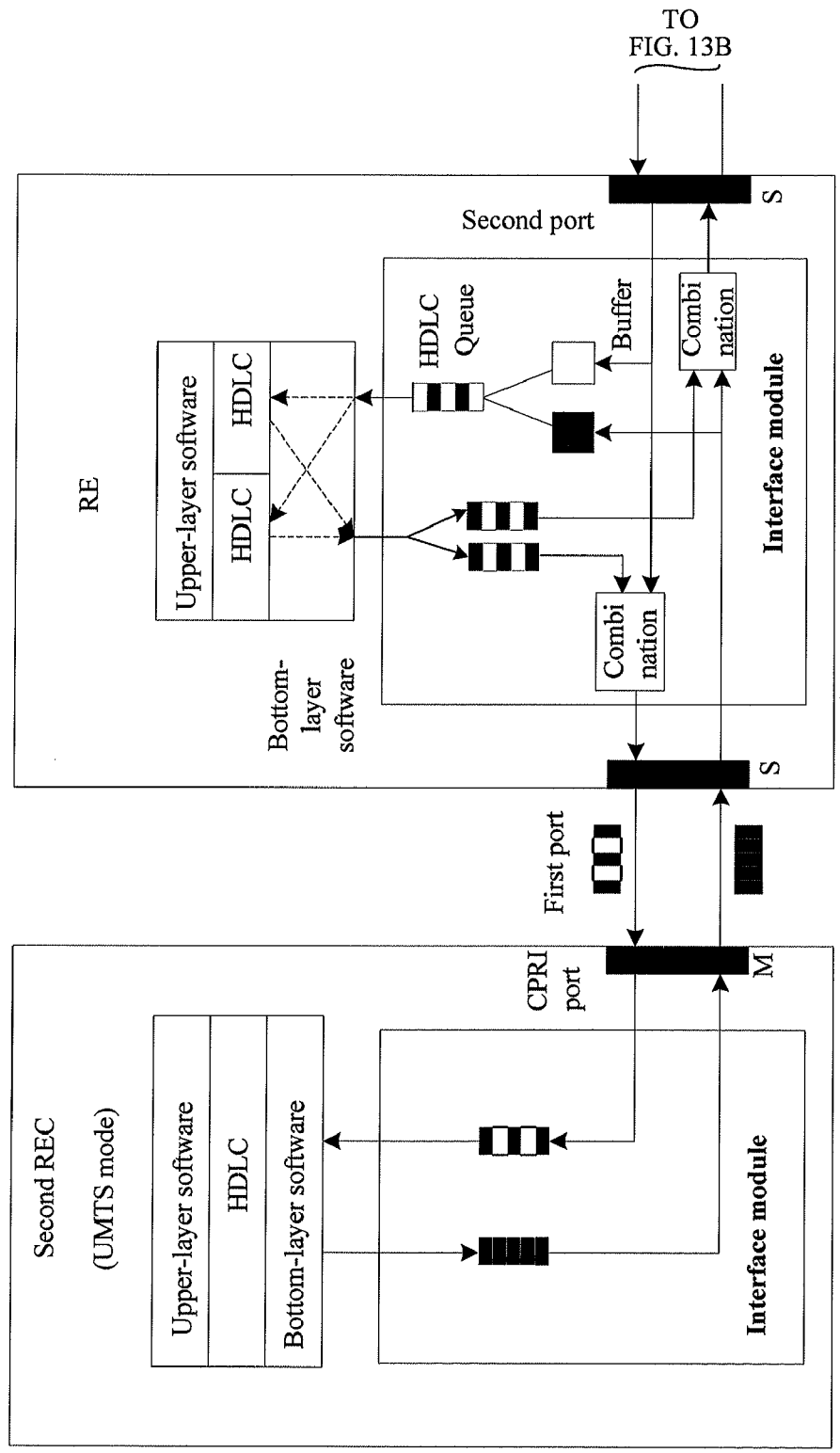
FIG. 13 is a schematic diagram of the control data transmission in a bidirectional link mode according to an embodiment of the present invention.
Figure 13B:
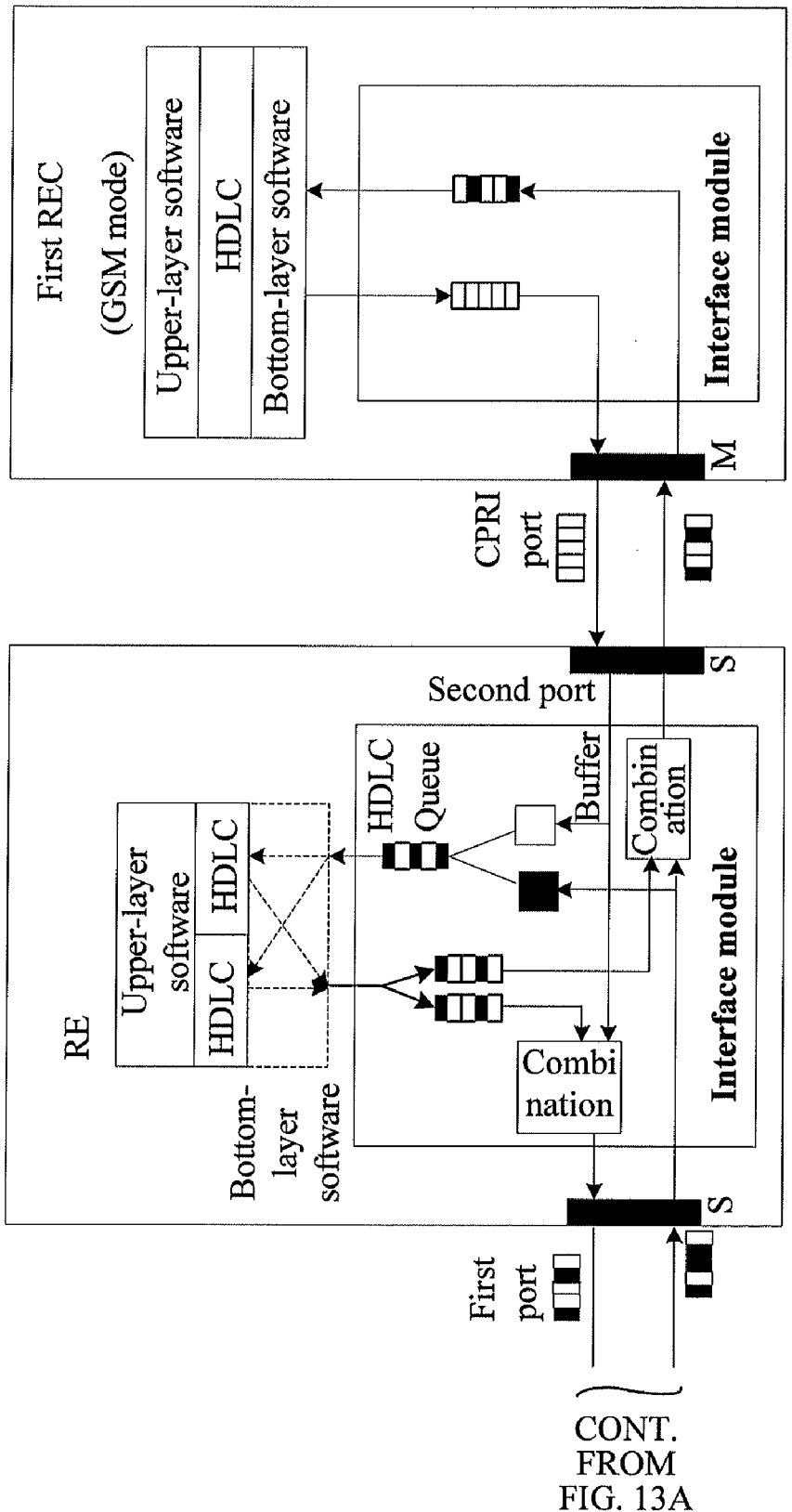

Referring to FIG. 13, the process of control data transmission in a bidirectional link mode is described as follows:

When an RE receives the control data, an interface module of the RE first buffers the control data received from RE's two ports and then queues the control data received by the two ports. Because the control data carries an HDLC address, two HDLC software modules may be set in the RE: one HDLC software module corresponding to a first REC, and the other HDLC software module corresponding to a second REC. The two HDLC software modules obtain, according to their respective HDLC addresses (for example, the HDLC address that is corresponding to the radio access technologies and is recorded by the RE described in step 605), their control data from the queue and forward the obtained control data to the high-level software module.

When the RE sends the control data, the interface module combines the control data (the control data carries the HDLC addresses allocated respectively by the first REC and the second REC to the RE) from two HDLC software modules and duplicates the combined control data, and then sends the duplicated control data through the first port and the second port respectively.

Specifically, when the RE receives the control data, the RE receives the control data through the first and second ports, and queues the received control data. The two HDLC software modules of the RE obtain, according to the HDLC addresses in the control data in the queue, their control data from the queue, and forward the obtained control data to the high-level software module.

When the RE sends the control data, the interface module combines the control data (the uplink control data needs to be sent to the first REC and the uplink control data needs to be sent to the second REC) from two HDLC software modules and duplicates the combined control data, then combines one duplicate with control data received through the first port and sends the combined data through the second port, and combines the other duplicate with control data received from the second port and sends the combined data through the first port. The uplink control data to be sent to the first REC carries the HDLC address allocated by the first REC and the control data to be sent to the second REC carries the HDLC address allocated by the second REC.

After the REC receives the control data, the HDLC software module of the REC obtains, according to the HDLC addresses in the control data, its control data from the received control data, and forwards the data to the high-level software module.

In this manner, the HDLC uplink and downlink data shares the bandwidth of the control plane (for example, a bandwidth of 3.84 Mbit/s).

Or, when the RE sends the control data, the interface module differentiates the control data from the first HDLC software module from the control data from the second HDLC software module, combines the control data of the first REC (control data from the first HDLC software module) with the control data received from the second port (control data from the second HDLC software module) and then sends the combined data from the first port; and combines the control data of the second REC with the control data received from the first port and sends the combined data from the second port.

Figure 14:
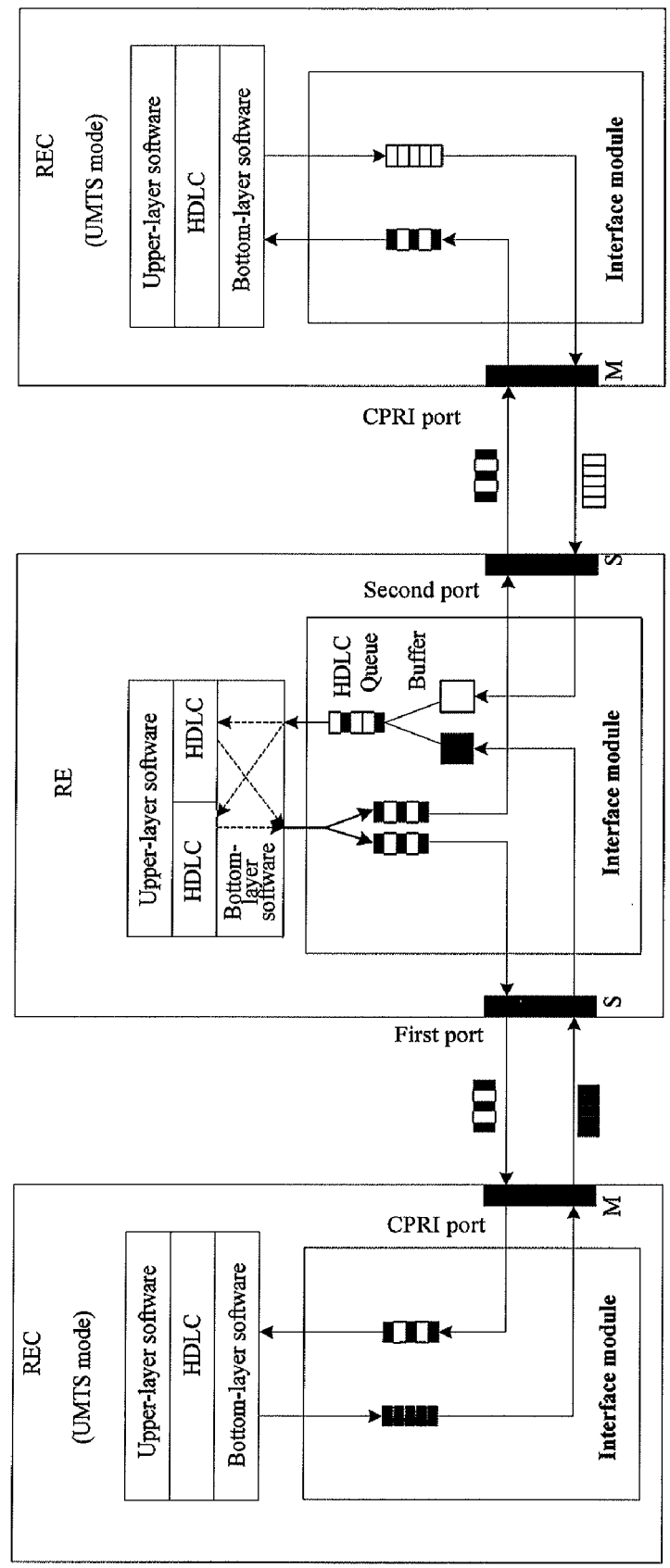
FIG. 14 is a schematic diagram of the control data transmission in a dual-star link mode according to an embodiment of the present invention.

Referring to FIG. 14, the process of control data transmission in a dual-star link mode is described as follows:

In the dual-star link mode, an RE does not need to forward downlink control data. When the RE receives the control data, an interface module buffers the control data received from two ports and queues the received control data. Two HDLC software modules of the RE obtain their respective control data from the queue according to their HDLC addresses (for example, the HDLC address that is corresponding to the radio access technologies and is recorded by the RE in step 605), and forwards the control data to the high-level software.

When the RE sends the control data, the interface module duplicates the control data (the control data carries the HDLC address allocated by an REC) from the two HDLC software modules, and sends the control data duplicates from the two ports respectively.

Specifically, when the RE receives the control data, the RE receives control data through the first and second ports and queues the received control data; the two HDLC software modules of the RE obtains their control data according to their HDLC addresses in the control data from the queue, and forwards the control data to the high-level software module.

When the RE sends the control data, a FPGA combines the control data (uplink control data to be sent to the first REC and uplink control data to be sent to the second REC) from the two HDLC software modules, duplicates the control data, and sends one duplicate through the first port and the other duplicate through the second port. The uplink control data to be sent to the first REC carries the HDLC address allocated by the first REC and the uplink control data to be sent to the second REC carries the HDLC address allocated by the second REC.

After the REC receives the control data, the HDLC software module of the REC obtains, according to the HDLC addresses in the control data, its control data from the received radio access technologies, and forwards the obtained control data to the high-level software module.

Or, when the RE sends the control data, the interface module differentiates the control data from the first HDLC software module from the control data from the second HDLC software module, sends the control data of the first REC (control data from the first HDLC software module) from the first port, and sends the control data of the second REC (control data from the second HDLC software module) from the second port.

It should be noted that the number of the CPRI port of the REC in the preceding FIGS. 11, 12, 13, and 14 is not limited to one, two or more ports may be available, which does not affect the implementation of the embodiments of the present invention.

The bidirectional link mode and dual-star link mode provided in above embodiments of the present invention is applicable to the case that RECs are arranged at two ends of the link. However, when the CPRI port at one side of the RE on the CPRI link is disconnected, if the link mode that a normal CPRI port receives is the dual-star link mode, the RE communicates with the corresponding REC through the normal port; if the link mode that the normal CPRI port receives is the bidirectional link mode, CPRI data receiving and sending is terminated at the disconnected port because the RE whose CPRI port is disconnected is actually the last node on the link. The data is received and sent at the normal CPRI port according to the bidirectional link mode.

Specifically, the RE receives control words such as a port ID and a slot ID from the normal port and does not forward these control words. During downlink service data receiving, the interface module, for example, FPGA, of the RE obtains its service data from the downlink service data received from the normal port, and sends the obtained service data to the high-level software. The downlink service data is no longer forwarded. During the uplink service data transmission, the hop number is initialized to be 1, and the uplink service data that needs to be sent is sent from the normal port.

Referring to FIG. 11, it is assumed that a second port of a second RE in FIG. 11 is disconnected. In one direction, a first REC sends downlink service data on a CPRI link; the first RE receives the downlink service data through a first port, obtains service data that the first RE needs, sends the service data to a high-level software module, combines uplink service data that needs to be sent to a second REC with the downlink service data, and sends the combined data through the second port. A second RE receives the service data through the first port, obtains downlink service data that the second RE needs, and sends the service data to the high-level software module. Because the second port is disconnected, the second RE no longer continues to forward data through the second port. In another direction, the second RE sends the uplink service data that needs to be sent to the first REC from the first port; after receiving through the second port the service data sent by the second RE through the first port, the first RE combines the uplink service data that needs to be sent to the first REC with the received service data, and sends the combined data from the first port.

If the two ports of the RE are both disconnected, an abnormality processing is carried out and the ports automatically recover after a period of time.

If one port of the RE is disconnected and the link mode indication information received by the remaining port which is normal is in a unidirectional link mode, the CPRI link of the RE is switched to the unidirectional link mode. In this case, the processing is the same as that in the prior art, which is not detailed here.

Another embodiment of the present invention provides a base station device. The base station device is applicable to a bidirectional link mode. The base station device supports multiple radio access technologies and includes: an RE, a first REC supporting a first group of radio access technology, and a second REC supporting a second group of radio access technology.

The first REC is configured to send downlink data corresponding to the first group of radio access technology to the RE.

The RE is configured to receive, through a first port, the downlink data corresponding to the first group of radio access technology supported by the first REC, obtain its data from the received downlink data corresponding to the first group of radio access technology, and combine uplink data corresponding to a second group of radio access technology with the received downlink data corresponding to the first group of radio access technology and then sends out the combined data through a second port.

The second REC is configured to receive the data sent by the RE through the second port, and obtain the uplink data corresponding to the second group of radio access technology from the received data.

In order to determine a link mode and send the indication information about link mode to the RE, the first REC is further configured to determine, according to a slot ID received from the link, that the group of radio access technology supported by the first REC and the group of radio access technology supported by the second REC are different, determine that the link mode is a bidirectional link mode according to the hop number received from the link, and send L1 information to the RE, where the L1 information includes information indicating the bidirectional link mode; or, the first REC is further configured to determine, according to radio access technology information received from a link, that the group of radio access technology supported by the second REC and the group of radio access technology supported by the first REC are different, determine that the link mode is a bidirectional link mode according to the hop number received from the link, and send L1 information to the RE, where the L1 information includes information indicating the bidirectional link mode.

Optionally, the first REC is further configured to report, when the determined link mode is different from a preconfigured link mode, an alarm indicating that the link mode is abnormal.

To facilitate the RE to better determine the radio access technologies supported by the ports, the first REC is further configured to send L1 information that includes the slot ID of the first REC, and broadcast a HDLC link setup message which includes the slot ID of the first REC and indication information about the first group of radio access technology. The second REC is further configured to send L1 information that includes the slot ID of the second REC, and broadcast a HDLC link setup message, where the HDLC link setup message includes the slot ID of the second REC and indication information about the second group of radio access technology. The RE is further configured to receive the L1 information sent by the first REC and the HDLC link setup message broadcast by the first REC, and determine, according to the slot ID of the first REC, that a first port receiving the L information sent by the first REC supports the first group of radio access technology; receive the L1 information sent by the second REC and the HDLC link setup message broadcast by the second REC, and determine, according to the slot ID of the second REC, that a second port receiving the L1 information sent by the second REC supports the second group of radio access technology.

Or, to facilitate the RE to better determine the radio access technologies supported by the ports, the first REC is further configured to send L1 information, where the L1 information includes the slot ID of the first REC and information about the first group of radio access technology. The second REC is further configured to send the L1 information, where the L1 information includes the slot ID of the second REC and information about the second group of radio access technology. The RE is configured to receive the L1 information sent by the first REC and determine that the first port receiving the L1 information sent by the first REC supports the first group of radio access technology; receive the L1 information sent by the second REC and determine that the second port receiving the L1 information sent by the second REC supports the second group of radio access technology.

It is easy to understand that the preceding section describes the process of data transmission in one direction, that is, the direction from the first REC to the second REC; the process of data transmission in another direction, that is, the direction from the second REC to the first REC, is described as follows:

The second REC is configured to send downlink data corresponding to the second group of radio access technology to the RE.

The RE is configured to receive, through a second port, downlink data corresponding to the second group of radio access technology supported by the second REC, obtain its data from the received downlink data corresponding to the second group of radio access technology, and combine uplink data corresponding to a first group of radio access technology with the downlink data corresponding to the second group of radio access technology and send the combined data through a first port.

The first REC is configured to receive the data sent by the RE through the first port, and obtain the uplink data corresponding to the first group of radio access technology from the received data.

The CPRI link of the base station provided in the above embodiment of the present invention is in a bidirectional link mode. The RE determines radio access technologies supported respectively by the RE's two ports, and transmits the data, for example, service data or control data, corresponding to the radio access technologies through the two ports to ensure that the RE can transmit the service data or control data normally when the base station supports multiple radio access technologies.

Another embodiment of the present invention provides a base station device. The base station device is applicable to a dual-star link mode, which includes an RE, a first REC supporting a first group of radio access technology, and a second REC supporting a second group of radio access technology.

The first REC is configured to send downlink data corresponding to a first group of radio access technology to the RE and receive uplink data corresponding to the first group of radio access technology from the RE.

The second REC is configured to send downlink data corresponding to a second group of radio access technology to the RE and receive uplink data corresponding to the second group of radio access technology from the RE.

In order to determine a link mode and send the indication information about link mode to the RE, the first REC is further configured to determine, according to a slot ID received from the link, that the group of radio access technology supported by the first REC and the group of radio access technology supported by the second REC are different, determine that the link mode is a bidirectional link mode according to the hop number received from the link, and send L1 information to the RE, where the L1 information includes information indicating the bidirectional link mode; or, the first REC is further configured to determine, according to radio access technology information received from a link, that the group of radio access technology supported by the second REC and the group of radio access technology supported by the first REC are different, determine that the link mode is a bidirectional link mode according to the hop number received from the link, and send L1 information to the RE, where the L1 information includes the information indicating the bidirectional link mode.

Optionally, the first REC is further configured to report an alarm indicating that the link mode is abnormal when the determined link mode is different from a preconfigured link mode.

To facilitate the RE to better determine the radio access technologies supported by the ports, the first REC is further configured to send L1 information that includes a slot ID of the first REC, and broadcast a HDLC link setup message, where the HDLC link setup message includes the slot ID of the first REC and indication information about the first group of radio access technology. The second REC is further configured to send the L1 information that includes the slot ID of the second REC, and broadcast the HDLC link setup message, where the HDLC link setup message includes the slot ID of the second REC and indication information about the second group of radio access technology. The RE is further configured to receive the L1 information sent by the first REC and the HDLC link setup message broadcast by the first REC, and determine, according to the slot ID of the first REC, that a first port receiving the L1 information sent by the first REC supports the first group of radio access technology; and receive the L1 information sent by the second REC and the HDLC link setup message broadcast by the second REC, and determine, according to the slot ID of the second REC, that a second port receiving the L1 information sent by the second REC supports the second group of radio access technology.

Or, to facilitate the RE to better determine the radio access technologies supported RE's ports, the first REC is further configured to send L1 information, where the L1 information includes the slot ID of the first REC and information about the first group of radio access technology. The second REC is further configured to send the L1 information, where the L1 information includes the slot ID of the second REC and information about the second group of radio access technology. The RE is configured to receive the L1 information sent by the first REC and determine that the first port receiving the L1 information sent by the first REC supports the first group of radio access technology; and receive the L1 information sent by the second REC and determine that the second port receiving the L1 information sent by the second REC supports the second group of radio access technology.

The CPRI link of the base station provided in the preceding embodiment of the present invention is in a dual-star link mode. The RE determines the radio access technologies supported respectively by the RE's two ports, and transmits the data, for example, service data or control data, corresponding to the radio access technologies by using the two ports to ensure that the RE can transmit the service data or control data normally when the base station supports multiple radio access technologies.

Figure 15:
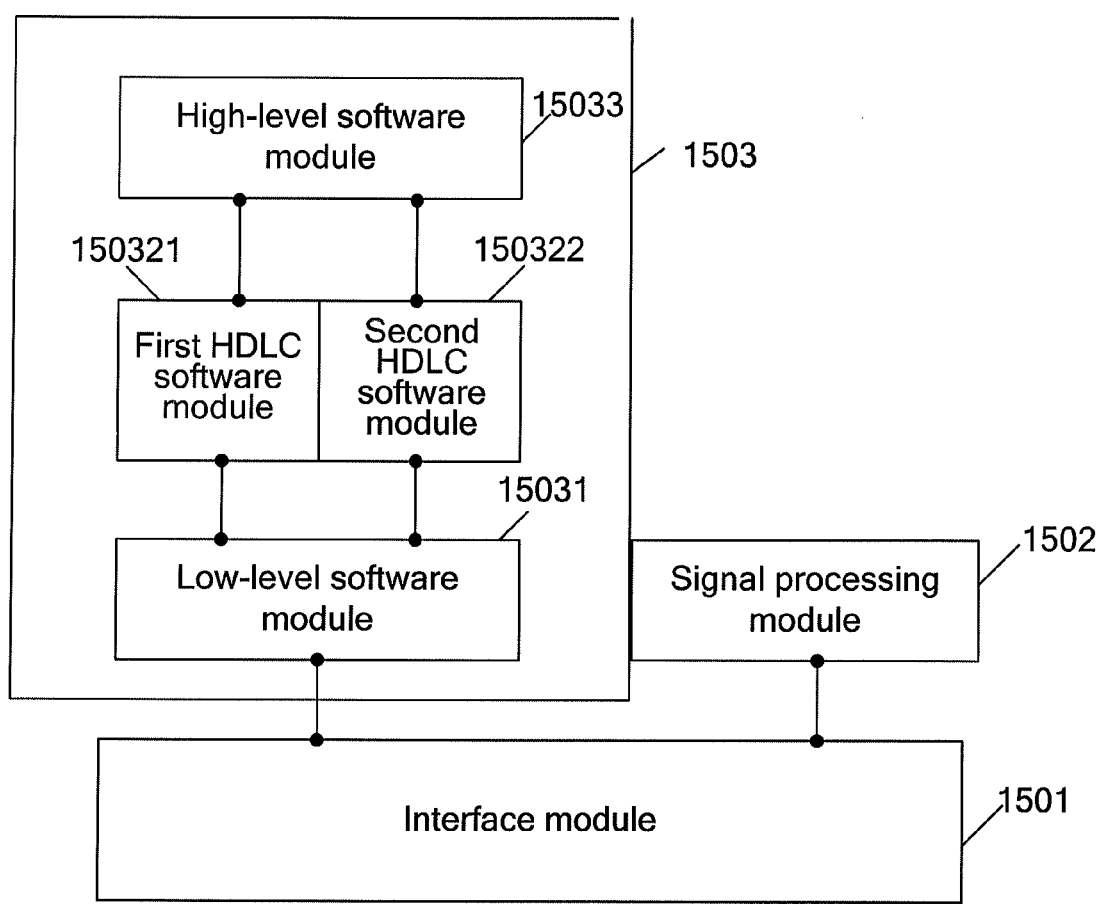
FIG. 15 is a schematic structural diagram of an RE according to an embodiment of the present invention.

Referring to FIG. 15, an embodiment of the present invention provides a radio equipment (RE). The RE includes: an interface module 1501, a signal processing module 1502, and a software module 1503. The software module 1503 includes a low-level software module 15031, a first HDLC software module 150321, a second HDLC software module 150322, and a high-level software module 15033. The RE apples to bidirectional link mode.

The interface module 1501 is configured to obtain service data of the RE from downlink service data that is corresponding to a first group of radio access technology and is sent by a first REC and received by the RE through a first port; and obtain the service data of the RE from downlink service data that is corresponding to the second group of radio access technology and is sent by a second REC, and is received from the RE through a second port;

The signal processing module 1502 is configured to receive the downlink service data corresponding to the first group of radio access technology from the interface module 1501 and send uplink service data corresponding to the second group of radio access technology supported by the second REC to the interface module 1501; and receive the downlink service data corresponding to the second group of radio access technology from the interface module 1501 and send uplink service data corresponding to the first group of radio access technology supported by the first REC to the interface module 1501.

The interface module 1501 combines the uplink service data corresponding to the second group of radio access technology from the signal processing module 1502 with the downlink service data corresponding to the first group of radio access technology, and then sends, through the second port, the combined data to the second REC; and combines the uplink service data corresponding to the first group of radio access technology from the signal processing module 1502 with the downlink service data corresponding to the second group of radio access technology, and then sends the combined data to the first REC from the first port.

Specifically, in order to determine radio access technologies supported by the ports, the interface module 1501 is further configured to receive Layer 1 information and HDLC link setup message through the first port, where the L1 information includes the slot ID of the first REC, and the HDLC link setup message includes the slot ID of the first REC and indication information about the first group of radio access technology; and receive L1 information and HDLC link setup message from the second port, where the L1 information includes the slot ID of the second REC, and the HDLC link setup message includes the slot ID of the second REC and indication information about the second group of radio access technology. The high-level software module 15033 is configured to read the slot ID of the first REC and indication information about the first port through the low-level software module 15031, read, through a first HDLC software module 150321, the slot ID of the first REC and the indication information about the first group of radio access technology in the HDLC link setup message received from the first port, and determine, according to the slot ID of the first REC, that the first port supports the first group of radio access technology; and read, through the low-level software module 15031, the slot ID of the second REC and indication information about the second port (the indication information about the second port may be a port ID, and is used for identifying the second port), read, through a second HDLC software module 150322, the slot ID of the second REC and the indication information about the second group of radio access technology in the HDLC link setup message received from the second port, and determine, according to the slot ID of the second REC, that the second port supports the second group of radio access technology.

Or, specifically, in order to determine radio access technologies supported by the ports, the interface module 1501 is further configured to receive, through the first port, L1 information including indication information about the first group of radio access technology; and receive, through the second port, L1 information including indication information about the second group of radio access technology. The high-level software module 15033 is configured to read, through the low-level software module 15031, the indication information about the first group of radio access technology and indication information about the first port, and determine that the first port supports the first group of radio access technology; and read, through the low-level software module 15031, the indication information about the second group of radio access technology and indication information about the second port, and determine that the second port supports the second group of radio access technology.

To send control data, the interface module 1501 is further configured to receive the control data from the first port and the second port and queue the received control data; combine the uplink control data corresponding to the first group of radio access technology from the first HDLC software module 150321 with uplink control data corresponding to the second group of radio access technology from the second HDCL software module 150322 and duplicate the combined control data; combine one duplicate with the control data received from the first port and send the combined data through the second port, and combine the other duplicate with the control data received through the second port and send the combined data through the first port. The first HDLC software module 150321 is further configured to obtain the downlink control data corresponding to the first group of radio access technology according to the HDLC address of the control data in the queue and the saved HDLC address allocated by the first REC to the RE. The second HDLC software module 150322 is configured to obtain the downlink control data corresponding to the second group of radio access technology according to the HDLC address in the control data in the queue and the saved HDLC address allocated by the second REC to the RE.

To obtain and save the HDLC address corresponding to the radio access technologies, that is, the HDLC address allocated by different RECs to the RE, the first HDLC software module 150321 is configured to receive an HDLC link setup message broadcast by the first REC, where the HDLC link setup message includes the hop number corresponding to the first group of radio access technology supported by the RE and an HDLC address allocated by the first REC to the RE; and obtain, according to the hop number corresponding to the first group of radio access technology supported by the RE, from the HDLC link setup message, the HDLC address allocated by the first REC to the RE, and save the obtained HDLC address. The second HDLC software module 150322 is configured to receive an HDLC link setup message broadcast by the second REC, where the HDLC link setup message broadcast by the second REC includes the hop number corresponding to the second group of radio access technology supported by the RE and an HDLC address allocated by the second REC to the RE; and obtain, according to the hop number of second group of radio access technology supported by the RE, from the HDLC link setup message, the HDLC address allocated by the second REC to the RE and save the obtained HDLC address.

The CPRI link provided in the preceding embodiment of the present invention is in a bidirectional link mode. The RE determines the radio access technologies supported respectively by the RE's two ports to ensure that the RE can transmit the service data normally and that the RE transmits the control data corresponding to the radio access technologies through the two ports when the base station supports multiple radio access technologies.

The interface module 1501 is configured to receive, through a first port from a first REC, downlink service data corresponding to a first group of radio access technology, and send the received service data to a signal processing module 1502; and receive, through a second port, from a second REC, downlink service data corresponding to a second group of radio access technology and send the data to the signal processing module 1502.

The signal processing module 1502 is configured to receive the downlink service data corresponding to the first group of radio access technology from the interface module 1501 and send uplink service data corresponding to the first group of radio access technology supported by the first REC to the interface module 1501; and receive the downlink service data corresponding to the second group of radio access technology from the interface module 1501 and send uplink service data corresponding to the second group of radio access technology supported by the second REC to the interface module 1501.

The interface module 1501 sends, through a first port, the uplink service data of the first REC supporting the first group of radio access technology from the signal processing module to the first REC, and sends, through a second port, the uplink service data of the second REC supporting the second group of radio access technology from the signal processing module to the second REC.

Specifically, in order to determine the radio access technologies supported by the ports, the interface module 1501 is further configured to receive, through the first port, L1 information and an HDLC link setup message, where the L1 information received through the first port includes the slot ID of the first REC, and the HDLC link setup message received through the first port includes the slot ID of the first REC and indication information about the first group of radio access technology; and receive L1 information and an HDLC link setup message through the second port, where the L1 information received through the second port includes the slot ID of the second REC, and the HDLC link setup message received through the second port includes the slot ID of the second REC and indication information about the second group of radio access technology. The high-level software module 15033 is configured to read, through the low-level software module 15031, the slot ID of the first REC and indication information about the first port, read, through a first HDLC software module 150321, the slot ID of the first REC and the indication information about the first group of radio access technology in the HDLC link setup message received from the first port, and determine, according to the slot ID of the first REC, that the first port supports the first group of radio access technology; and read, through the low-level software module 15031, the slot ID of the second REC and indication information about the second port, read, through a second HDLC software module 150322, the slot ID of the second REC and the indication information about the second group of radio access technology in the HDLC link setup message received through the second port, and determine, according to the slot ID of the second REC, that the second port supports the second group of radio access technology.

Or, in order to determine radio access technologies supported by the ports, the interface module 1501 is further configured to receive, through the first port, L1 information including indication information about the first group of radio access technology; and receive, through the second port, the L1 information including indication information about the second group of radio access technology. The high-level software module 15033 is configured to read, through the low-level software module 15031, the indication information about the first group of radio access technology and the indication information about the first port, and determine that the first port supports the first group of radio access technology; and read the indication information about the second group of radio access technology and the indication information about the second port through the low-level software module, and determine that the second port supports the second group of radio access technology.

In order to send control data, the interface module 1501 is further configured to receive the control data through the first and second ports and queue the received control data; and combine uplink control data corresponding to the first group of radio access technology from the first HDLC software module 150321 with uplink control data corresponding to the second group of radio access technology from the second HDLC software module 150322 and duplicate the combined control data and then send the control data duplicates respectively from the first port and the second port. The first HDLC software module 150321 is configured to obtain, from the queue, downlink control data corresponding to the first group of radio access technology, according to the HDLC address in the control data in the queue and the saved HDLC address allocated by the first REC to the RE. The second HDLC software module 150322 is further configured to obtain, from the queue, downlink control data corresponding to the second group of radio access technology, according to the HDLC address in the control data in the queue and the saved HDLC address allocated by the second REC to the RE.

To obtain and save the HDLC address, the first HDLC software module 150321 is further configured to receive an HDLC link setup message broadcast by the first REC, where the HDLC link setup message includes the hop number corresponding to the first group of radio access technology supported by the RE and HDLC address that is corresponding to the hop number and is allocated by the first REC; and obtain the HDLC address corresponding to the hop number corresponding to the first group of radio access technology supported by the RE and save the obtained HDLC address. The second HDLC software module 150322 is further configured to receive an HDLC link setup message broadcasted by the second REC, where the HDLC link setup message includes the hop number corresponding to the second group of radio access technology supported by the RE and HDLC address that is corresponding to the hop number and is allocated by the second REC; and obtain the HDLC address corresponding to the hop number corresponding to the second group of radio access technology supported by the RE and save the obtained HDLC address.

The CPRI link provided in the preceding embodiment of the present invention is in a dual-star link mode. The RE determines the radio access technologies supported respectively by the RE's two ports, and transmits service data corresponding to the radio access technologies from the two ports to ensure that the RE can transmit the service data normally when the base station supports multiple radio access technologies. In addition, the RE can transmit the control data normally according to this embodiment when the base station supports multiple radio access technologies.

Figure 16:
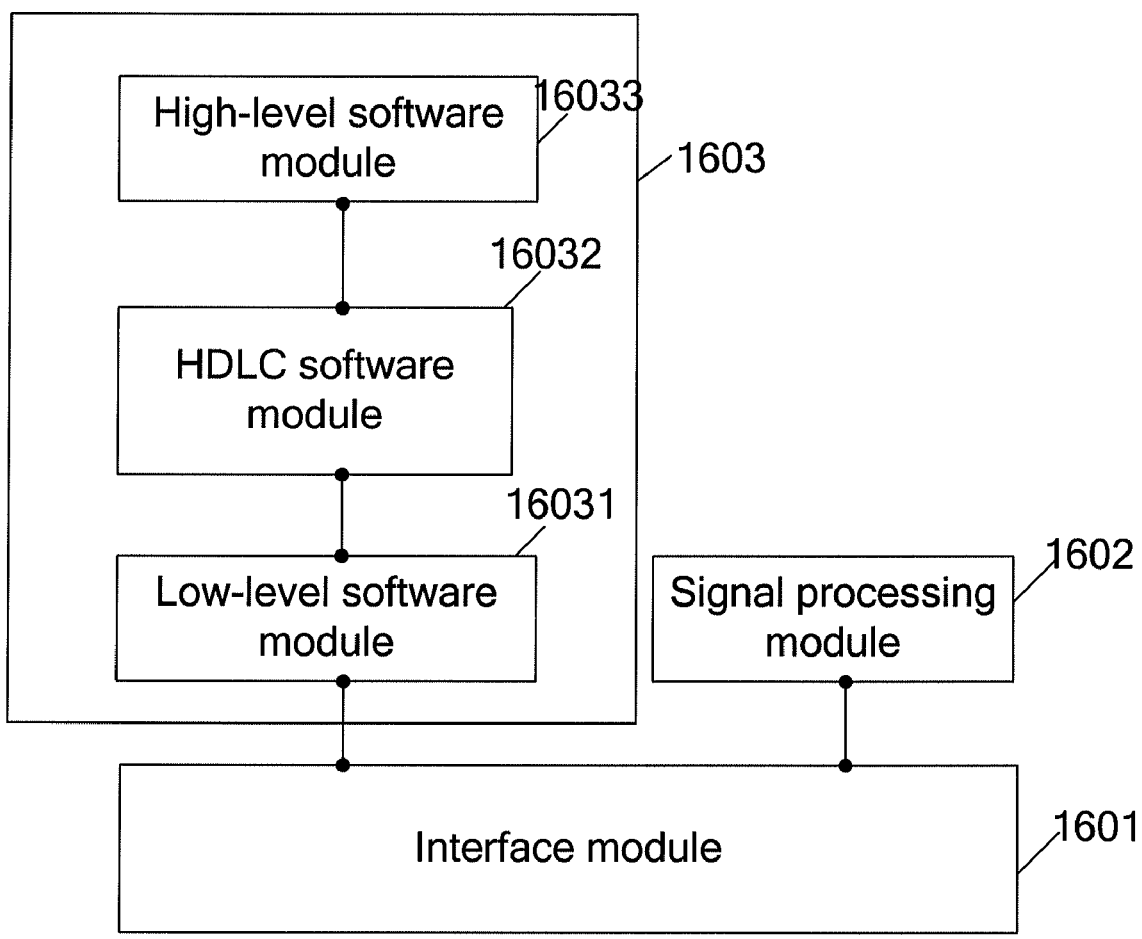
FIG. 16 is a schematic structural diagram of an REC according to an embodiment of the present invention.

An embodiment of the present invention provides a radio equipment controller (REC) whose structure is shown as in FIG. 16. Referring to FIG. 16, the REC includes an interface module 1601, a signal processing module 1602, and a software module 1603. The software module 1603 includes a low-level software module 16031, an HDLC software module 16032, and a high-level software module 16033.

The interface module 1601 is configured to receive service data sent by a peer REC through an RE, and obtain uplink service data corresponding to radio access technologies supported by the REC. When the service data is sent, and passes through the RE, the uplink service data that is corresponding to the radio access technology supported by the REC and is sent by the RE to the REC is added to the service data.

The signal processing module 1602 is configured to receive, from the interface module 1601, the uplink service data corresponding to the radio access technologies supported by the REC.

In order to send control data, the interface module 1601 is further configured to receive the control data, and the HDLC software module 16032 is configured to obtain the control data corresponding to the radio access technologies supported by the REC from the control data received by the interface module 1601.

In order to determine a link mode, the interface module 1601 is further configured to receive L1 information from the first port, where the L1 information includes the slot ID of the peer REC and the hop number of the peer REC. The high-level software module 16033 is configured to read the slot ID and hop number of the peer REC through the low-level software module 16031, and determine, according to the slot ID of the peer REC, that the group of radio access technology supported by the peer REC and group of radio access technology supported by the RE C are different; and determine that the link mode is a bidirectional link mode or a dual-star mode according to the hop number, and control the interface module 1601 through the low-level software module 16031 to send the L1 information, where the L1 information includes indication information about the determined link mode.

Or, in order to determine the link mode, the interface module 1601 is further configured to receive L1 information from the first port, where the L1 information includes indication information about the radio access technologies supported by the peer REC and the hop number. The high-level software module 16033 is configured to read, through the low-level software module 16031 the indication information about the radio access technologies supported by the peer REC and the hop number, determine, according to the indication information about the radio access technology supported by the peer REC, that the group of radio access technology supported by the peer REC and the group of radio access technology supported by the REC are different, and determine that a link is a bidirectional link mode or a dual-star mode according to the hop number, and control the interface module 1601 through the low-level software module 16031 to send the L1 information, where the L1 information includes indication information about the determined link mode.

Optionally, the high-level software module 16033 is further configured to report an alarm indicating that the link mode is abnormal when the determined link mode is different from a preconfigured link mode.

According to the preceding embodiment, the REC can obtain, from the received service data, the uplink service data corresponding to the radio access technologies supported by the REC, and discard the service data that does not belong to the REC to ensure that the base station can support multiple radio access technologies.

It is understandable to those skilled in the art that all or part of the steps in the preceding methods may be implemented by a program instructing relevant hardware. The programs may be stored in a computer readable storage medium. The storage medium may be a read only memory (ROM), random access memory (RAM), a magnetic disk or a compact disk.

The above describe the base station supporting multiple radio access technologies and the data transmission method on the CPRI link according to the embodiments of the present invention. The principle and implementation method for the present invention has been described through some exemplary embodiments. The preceding embodiments merely help to understand the methods and the core spirit of the present invention. Further, according to the concept of the present invention, those skilled in the art can make various modifications under the implementation method and application scope. Accordingly, the content of the specification of the present invention is not intended to limit the present invention.

What is claimed is:

1. A multi-mode base station, comprising:
   one or more radio equipments (REs) each having a first port and a second port;
   a first radio equipment controller (REC) supporting a first radio access technology; and
   a second REC supporting a second radio access technology;
   wherein the first REC is configured to send first downlink data corresponding to the first radio access technology to the RE;
   wherein the RE is configured to:
      receive, through a first port of the RE, the first downlink data from the first REC,
      obtain, from the received first downlink data, data belonging to the RE,
      combine first uplink data corresponding to the second radio access technology with the received first downlink data from the first REC to form first combination data, and
      send the first combination data through a second port of the RE; and
   wherein the second REC is configured to receive the first combination data from the RE, and to obtain the first uplink data corresponding to the second group radio access technology from the received first combination data; and
   wherein the first REC is further configured to:
   determine, according to a slot ID received from a link, that the first radio access technology supported by the first REC is different from the second radio access technology supported by the second REC,
   determine, according to a hop number received from the link, that a link mode of the link is a bidirectional link mode, and
   transmit layer 1 (L1) information to the RE, wherein the L1 information comprises indication information of the bidirectional link mode.

2. The base station according to claim 1, wherein the first REC is further configured to report an alarm indicating that the link mode is abnormal when the determined bidirectional link mode is different from a preconfigured link mode.

3. The base station according to claim 1, wherein
   the first REC is further configured to send first L1 information carrying a slot ID of the first REC, and configured to broadcast a first high-level data link control (HDLC) link setup message comprising a slot ID of the first REC and indication information about the first radio access technology;
   the RE is further configured to receive, from the first REC, the first L1 information and the first HDLC link setup message, and configured to determine, according to the slot ID in the first L1 information being the same with the slot ID in the first HDLC link setup message, that the first port, through which the RE receive the first L1 information, supports the first radio access technology.

4. The base station according to claim 1, wherein
   the second REC is further configured to transmit second L1 Layer 1 (L1) information carrying a slot ID of the second REC, and broadcast a second high-level data link control (HDLC) link setup message comprising a slot ID of the second REC and indication information about the second radio access technology; and the RE is further configured to receive, from the second REC, the second L1 information and the second HDLC link setup message, and configured to determine, according to the slot ID in the second L1 information being the same with the slot ID in the second HDLC link setup message, that the second port, through which the RE receives the second L1 information from the first REC, supports the second radio access technology.

5. The base station according to claim 1, wherein
the first REC is further configured to send third L1 information including a slot ID of the first REC and information about the first radio access technology; and
the RE is configured to receive the third L1 information from the first REC, and configured to determine, according to the received third L1 information, that the first port, through which the RE receives the third L1 information, supports the first radio access technology.

6. The base station according to claim 1, wherein
the second REC is further configured to send fourth L1 Layer 1 (L1) information including a slot ID of the second REC and information about the second radio access technology; and
the RE is further configured to receive the fourth L1 information sent from the second REC, and configured to determine, according to the received fourth L1 information, that the second port, through which the RE receives the fourth L1 information from the second REC, supports the second radio access technology.

7. The base station according to claim 1, wherein
the second REC is further configured to send second downlink data corresponding to the second radio access technology to the RE;
the RE is further configured to receive, through the second port of the RE, the second downlink data from the second REC, configured to obtain, from the received second downlink data, data belonging to the RE, configured to combine second uplink data corresponding to the first radio access technology with the received second downlink data from the second REC to form second combination data, and to send the second combination data through the first port of the RE; and
the first REC is configured to receive the second combination data, and obtain the second uplink data corresponding to the first radio access technology from the received second combination data.

8. The base station according to claim 1, wherein the first radio access technology is any one or combination of global system for mobile communications (GSM), universal mobile telecommunications system (UMTS), code division multiple access (CDMA), worldwide interoperability for microwave access (WIMAX), and long term evolution (LTE), and the second radio access technology is any one or combination of GSM, UMTS, CDMA, WIMAX and LTE.

9. A multi-mode base station, comprising:
one or more radio equipments (REs) each having a first port and a second port;
a first radio equipment controller (REC) supporting a first radio access technology; and
a second REC supporting a second radio access technology;
wherein the first REC is configured to send first downlink data corresponding to the first radio access technology to the RE;
wherein the RE is configured to:
receive, through a first port of the RE, the first downlink data from the first REC,
obtain, from the received first downlink data, data belonging to the RE,
combine first uplink data corresponding to the second radio access technology with the received first downlink data from the first REC to form first combination data, and
send the first combination data through a second port of the RE; and
wherein the second REC is configured to receive the first combination data from the RE, and to obtain the first uplink data corresponding to the second group radio access technology from the received first combination data; and
wherein the first REC is further configured to:
determine, according to radio access technology information received from a link, that the first radio access technology supported by the first REC is different from the second radio access technology supported by the second REC,
determine, according to a hop number received from the link, that a link mode of the link is a bidirectional link mode, and
send Layer 1 (L1) information to the RE, wherein the L1 information comprises indication information indicating the bidirectional link mode.

10. The base station according to claim 9, wherein the first REC is further configured to report an alarm indicating that the link mode is abnormal when the determined link mode is different from a preconfigured link mode.

11. The base station according to claim 9, wherein
the first REC is further configured to send first L1 information carrying a slot ID of the first REC, and configured to broadcast a first high-level data link control (HDLC) link setup message comprising a slot ID of the first REC and indication information about the first radio access technology;
the RE is further configured to receive, from the first REC, the first L1 information and the first HDLC link setup message, and configured to determine, according to the slot ID in the first L1 information being the same with the slot ID in the first HDLC link setup message, that the first port, through which the RE receive the first L1 information, supports the first radio access technology.

12. The base station according to claim 9, wherein
the second REC is further configured to transmit second L1 information carrying a slot ID of the second REC, and broadcast a second high-level data link control (HDLC) link setup message comprising a slot ID of the second REC and indication information about the second radio access technology; and
the RE is further configured to receive, from the second REC, the second L1 information and the second HDLC link setup message, and configured to determine, according to the slot ID in the second L1 information being the same with the slot ID in the second HDLC link setup message, that the second port, through which the RE receives the second L1 information from the first REC, supports the second radio access technology.

13. The base station according to claim 9, wherein
the first REC is further configured to send third L1 information including a slot ID of the first REC and information about the first radio access technology; and
the RE is configured to receive the third L1 information from the first REC, and configured to determine, according to the received third L1 information, that the first port, through which the RE receives the third L1 information, supports the first radio access technology.

14. The base station according to claim 9, wherein
the second REC is further configured to send fourth L1 information including a slot ID of the second REC and information about the second radio access technology; and
the RE is further configured to receive the fourth L1 information sent from the second REC, and configured to determine, according to the received fourth L1 information, that the second port, through which the RE receives the fourth L1 information from the second REC, supports the second radio access technology.

15. The base station according to claim 9, wherein
the second REC is further configured to send second downlink data corresponding to the second radio access technology to the RE;
the RE is further configured to receive, through the second port of the RE, the second downlink data from the second REC, configured to obtain, from the received second downlink data, data belonging to the RE, configured to combine second uplink data corresponding to the first radio access technology with the received second downlink data from the second REC to form second combination data, and to send the second combination data through the first port of the RE; and
the first REC is configured to receive the second combination data, and obtain the second uplink data corresponding to the first radio access technology from the received second combination data.

16. The base station according to claim 9, wherein the first radio access technology is any one or combination of global system for mobile communications (GSM), universal mobile telecommunications system (UMTS), code division multiple access (CDMA), worldwide interoperability for microwave access (WIMAX), and long term evolution (LTE), and the second radio access technology is any one or combination of GSM, UMTS, CDMA, WIMAX and LTE.

17. A method of data transmission, comprising:
sending first downlink data corresponding to a first radio access technology from a first radio equipment controller (REC) supporting the first radio access technology of a base station to a radio equipment (RE) of the base station;
receiving, by the RE, the downlink data sent from the first REC through a first port of the RE;
obtaining, by the RE, data belonging to the RE from the received first downlink data;
combining, by the RE, the first downlink data received from the first REC with first uplink data corresponding to a second radio access technology with to form first combination data;
sending, by the RE, the first combination data through a second port of the RE;
receiving, by a second REC supporting the second radio access technology of the base station, the first combination data from the RE;
obtaining, by the second REC, the first uplink data corresponding to the second group radio access technology from the received first combination data;
determining, by the first REC according to a slot ID received from a link, that the first radio access technology supported by the first REC is different from the second radio access technology supported by the second REC;
determining, by the first REC, that a link mode of the link is a bidirectional link mode according to a hop number received from the link, and
transmitting, by the first REC, layer 1 (L1) information to the RE, the L1 information including indication information indicating the bidirectional link mode.

18. The method according to claim 17, further comprising:
reporting, by the first REC, an alarm indicating that the link mode is abnormal when the determined bidirectional link mode is different from a preconfigured link mode.

19. The method according to claim 17, further comprising:
transmitting, by the first REC, first L1 information including a slot ID of the first REC,
broadcasting, by the first REC, a first high-level data link control (HDLC) link setup message comprising a slot ID of the first REC and indication information about the first radio access technology;
receiving, by the RE, the first L1 information and the first HDLC link setup message;
determining, by the RE, that the first port through which the RE receive the first L1 information supports the first radio access technology, based on the slot ID in the first L1 information being the same with the slot ID in the first HDLC link setup message.

20. The method according to claim 17, further comprising:
transmitting, by the second REC, second L1 information including a slot ID of the second REC;
broadcasting, by the second REC, a second high-level data link control (HDLC) link setup message comprising a slot ID of the second REC and indication information about the second radio access technology; and
receiving, by the RE from the second REC, the second L1 information and the second HDLC link setup message;
determining, by the RE, that the second port of the RE supports the second radio access technology, according to the slot ID in the second L1 information being the same with the slot ID in the second HDLC link setup message.

21. The method according to claim 17, further comprising:
sending, by the first REC, a third send third L1 information to the RE, the third L1 information including a slot ID of the first REC and information about the first radio access technology; and
determining, by the RE, according to the third L1 information send from the first REC, that the first port supports the first radio access technology.

22. The method according to claim 17, further comprising:
sending, by the second REC, fourth L1 information including a slot ID of the second REC and information about the second radio access technology;
receiving, by the RE, the fourth L1 information sent from the second REC; and
determining, by the RE, according to the received fourth L1 information, that the second port supports the second radio access technology.

23. The method according to claim 17, further comprising:
transmitting, by the second REC, second downlink data corresponding to the second radio access technology to the RE;
receiving, by the RE through the second port, the second downlink data sent from the second REC;
obtaining, by the RE, data belonging to the RE from the received second downlink data;
combining, by the RE, second uplink data corresponding to the first radio access technology with the received second downlink data from the second REC to form second combination data;
transmitting, by the RE, the second combination data through the first port of the RE; and receiving, by the first REC, the second combination data; and obtaining, by the first REC, the second uplink data corresponding to the first group radio access technology from the received second combination data.

24. The method according to claim 17, where the first and second radio first radio access technologies comprise any one or combination of global system for mobile communications (GSM), universal mobile telecommunications system (UMTS), code division multiple access (CDMA), worldwide interoperability for microwave access (WIMAX), and long term evolution (LTE).

25. A method of data transmission, comprising:
sending first downlink data corresponding to a first radio access technology from a first radio equipment controller (REC) supporting the first radio access technology of a base station to a radio equipment (RE) of the base station;
receiving, by the RE, the downlink data sent from the first REC through a first port of the RE;
obtaining, by the RE, data belonging to the RE from the received first downlink data;
combining, by the RE, the first downlink data received from the first REC with first uplink data corresponding to a second radio access technology with to form first combination data;
sending, by the RE, the first combination data through a second port of the RE;
receiving, by a second REC supporting the second radio access technology of the base station, the first combination data from the RE;
obtaining, by the second REC, the first uplink data corresponding to the second group radio access technology from the received first combination data;
determining, by the first REC, according to radio access technology information received from a link, that the first radio access technology supported by the first REC is different from the second radio access technology supported by the second REC,
determining, by the first REC, according to a hop number received from the link, that a link mode of the link is a bidirectional link mode, and
sending, by the first REC, Layer 1 (L1) information to the RE, the L1 Layer information including indication information about the bidirectional link mode.

26. The method according to claim 25, further comprising:
reporting, by the first REC, an alarm indicating that the link mode is abnormal when the determined bidirectional link mode is different from a preconfigured link mode.

27. The method according to claim 25, further comprising:
transmitting, by the first REC, first L1 information including a slot ID of the first REC,
broadcasting, by the first REC, a first high-level data link control (HDLC) link setup message comprising a slot ID of the first REC and indication information about the first radio access technology;
receiving, by the RE, the first L1 information and the first HDLC link setup message;
determining, by the RE, that the first port through which the RE receive the first L1 information supports the first radio access technology, based on the slot ID in the first L1 information being the same with the slot ID in the first HDLC link setup message.

28. The method according to claim 25, further comprising:
transmitting, by the second REC, second L1 information including a slot ID of the second REC;
broadcasting, by the second REC, a second high-level data link control (HDLC) link setup message comprising a slot ID of the second REC and indication information about the second radio access technology; and
receiving, by the RE from the second REC, the second L1 information and the second HDLC link setup message;
determining, by the RE, that the second port of the RE supports the second radio access technology, according to the slot ID in the second L1 information being the same with the slot ID in the second HDLC link setup message.

29. The method according to claim 25, further comprising:
sending, by the first REC, a third send third L1 information to the RE, the third L1 information including a slot ID of the first REC and information about the first radio access technology; and
determining, by the RE, according to the third L1 information send from the first REC, that the first port supports the first radio access technology.

30. The method according to claim 25, further comprising:
sending, by the second REC, fourth L1 information including a slot ID of the second REC and information about the second radio access technology;
receiving, by the RE, the fourth L1 information sent from the second REC; and
determining, by the RE, according to the received fourth L1 information, that the second port supports the second radio access technology.

31. The method according to claim 25, further comprising:
transmitting, by the second REC, second downlink data corresponding to the second radio access technology to the RE;
receiving, by the RE through the second port, the second downlink data sent from the second REC;
obtaining, by the RE, data belonging to the RE from the received second downlink data;
combining, by the RE, second uplink data corresponding to the first radio access technology with the received second downlink data from the second REC to form second combination data;
transmitting, by the RE, the second combination data through the first port of the RE; and
receiving, by the first REC, the second combination data; and
obtaining, by the first REC, the second uplink data corresponding to the first group radio access technology from the received second combination data.

32. The method according to claim 25, where the first and second radio first radio access technologies comprise any one or combination of global system for mobile communications (GSM), universal mobile telecommunications system (UMTS), code division multiple access (CDMA), worldwide interoperability for microwave access (WIMAX), and long term evolution (LTE).

* * * * *